United States Patent [19]

Van der Heijden et al.

[11] 4,357,607
[45] Nov. 2, 1982

[54] VIDEO EXTRACTOR

[75] Inventors: Wilhelmus F. Van der Heijden, Gouda; Edward L. Intres, Moordrecht, both of Netherlands

[73] Assignee: Hollandse Signaalapparaten B.V., Hengelo, Netherlands

[21] Appl. No.: 117,681

[22] Filed: Feb. 1, 1980

[30] Foreign Application Priority Data

Feb. 9, 1979 [NL] Netherlands ............... 7901028

[51] Int. Cl.³ .................................... G01S 7/44
[52] U.S. Cl. ........................................ 343/5 VQ
[58] Field of Search ................... 343/5 PD, 5 VQ

[56] References Cited

U.S. PATENT DOCUMENTS 3,836,964 9/1974 Evans ..................... 343/5 VQ X

Primary Examiner—T. H. Tubbesing
Attorney, Agent, or Firm—Robert J. Kraus

[57] ABSTRACT

A video extractor for use in a pulse radar apparatus comprises a shift-register memory for storing a number of words, each of which containing the information about the target position and size, as established for each of the range quants in which the desired range interval is divided. The video extractor thereto contains a range counter, whose counting rate is equal to the rate at which said words are shifted into the memory. An arithmetic unit receives the words shifted out of the memory and, in response to the video and angular data from the pulse radar apparatus and to the range data provided by the range counter, updates if necessary all information contained in said words with each successive range sweep. Because all information referring to one target has to be concentrated in a single word the arithmetic unit transfers the updated information to following or preceding words fetched from the memory. A readout circuit connected to the arithmetic unit and to the range counter is used to read out the information referring to the particular target.

29 Claims, 22 Drawing Figures

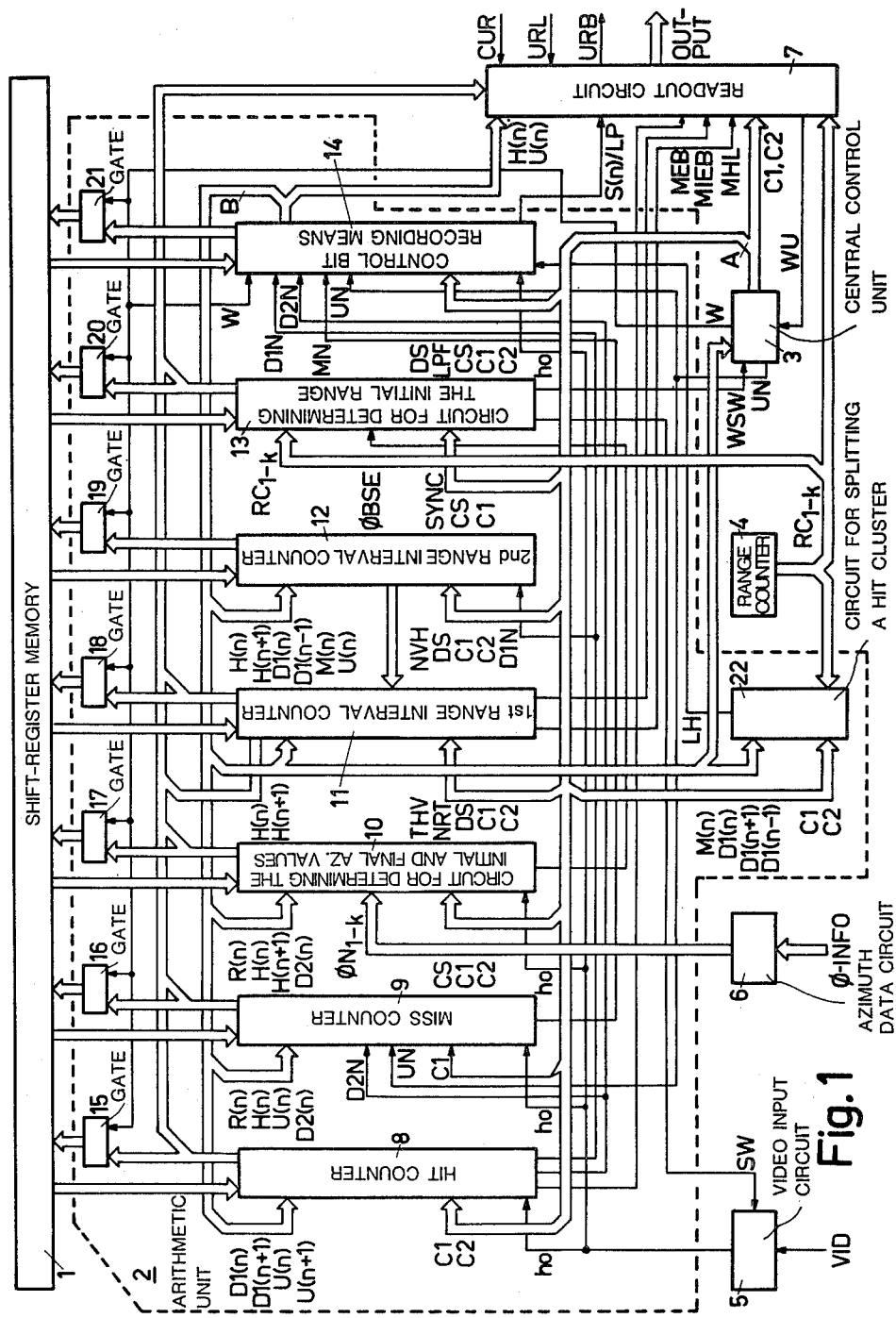

|    | HS      | MS      | R D M U |
|----|---------|---------|---------|
| 1  | 0 0 0 0 | 0 0 0 0 | 0 0 0 0 |
| 2  | 0 0 0 1 | 0 0 0 0 | 1 0 0 0 |
| 3  | 0 0 1 0 | 0 0 0 0 | 1 0 0 0 |
| 4  | 0 0 1 1 | 0 0 0 0 | 1 1 0 0 |
| 5  | 0 1 0 0 | 0 0 0 0 | 1 1 0 0 |
| 6  | 0 1 0 1 | 0 0 0 0 | 1 1 0 0 |
| 7  | 0 1 1 0 | 0 0 0 0 | 1 1 0 0 |
| 8  | 0 1 1 1 | 0 0 0 0 | 1 1 0 0 |
| 9  | 1 0 0 0 | 0 0 0 0 | 1 1 0 0 |
| 10 | 1 0 0 0 | 0 0 0 1 | 1 1 0 0 |
| 11 | 1 0 0 0 | 0 0 1 0 | 1 1 0 0 |
| 12 | 1 0 0 0 | 0 0 1 1 | 1 1 1 0 |
| 13 | 1 0 0 0 | 0 0 1 1 | 1 1 1 1 |
| 14 | 0 0 0 0 | 0 0 0 0 | 0 0 0 0 |

|    | HS      | MS      | R D M U |
|----|---------|---------|---------|
| 1  | 0 0 0 0 | 0 0 0 0 | 0 0 0 0 |
| 2  | 0 0 0 1 | 0 0 0 0 | 1 0 0 0 |
| 3  | 0 0 0 1 | 0 0 0 1 | 1 0 0 0 |
| 4  | 0 0 0 1 | 0 0 1 0 | 1 0 0 0 |
| 5  | 0 0 1 0 | 0 0 0 1 | 1 0 0 0 |
| 6  | 0 0 1 1 | 0 0 0 0 | 1 1 0 0 |
| 7  | 0 1 0 0 | 0 0 0 0 | 1 1 0 0 |
| 8  | 0 1 0 0 | 0 0 0 1 | 1 1 0 0 |
| 9  | 0 1 0 1 | 0 0 0 0 | 1 1 0 0 |
| 10 | 0 1 1 0 | 0 0 0 0 | 1 1 0 0 |
| 11 | 0 1 1 0 | 0 0 0 1 | 1 1 0 0 |
| 12 | 0 1 1 0 | 0 0 1 0 | 1 1 0 0 |
| 13 | 0 1 1 1 | 0 0 0 1 | 1 1 0 0 |
| 14 | 0 1 1 1 | 0 0 1 0 | 1 1 0 0 |
| 15 | 0 1 1 1 | 0 0 1 1 | 1 1 1 0 |
| 16 | 0 1 1 1 | 0 0 1 1 | 1 1 1 1 |
| 17 | 0 0 0 0 | 0 0 0 0 | 0 0 0 0 |

VIDEO EXTRACTOR

BACKGROUND OF THE INVENTION

The invention relates to a video extractor for use in a pulse radar apparatus.

For the automatic processing of radar information in digital computers it is necessary to convert the analog radar signal into a digital form. Since the received analog signal contains a substantial amount of irrelevant data, such as noise, clutter, etc., video extractors are employed in pulse radars to reduce the computer load. The function of a video extractor is to extract usable information from the signal and to apply this information in a suitable form to the computer for further processing. Differences between radar systems and different applications demand different embodiments of such video extractors. It is therefore a primary object of the invention to provide a video extractor which, through numerous adjustable parameters, is adaptable to different types of radars and is suitable for many applications.

A fully universal extractor however cannot be realized. Adaptation to a specific radar system must done. The commonly known and simplest "moving window" extractor is dependent upon radar parameters, such that each type of radar requires its own design. Moving-window extractors are impracticable for short ranges, such as in harbors, in view of the dimensions and the small distance between the targets. The "detector accumulator", also of prior art, is considerably more flexible in this respect and gives a greater positional accuracy. Disadvantages of the latter type of extractor are a confined memory capacity and relatively complex logic circuitry. Another object of the invention is therefore to provide a video extractor in which the advantages of the two above-mentioned types are retained, whereas their disadvantages are obviated and a more flexible setting of the parameters can be achieved.

SUMMARY OF THE INVENTION

According to the invention the video extractor is characterized by a combination of:
a shift-register memory, which is capable of storing a number of words corresponding with the number of range quants dividing the range interval to be covered by the pulse radar apparatus, said words containing the information about the target position and size, as established for each range quant;
a range counter whose counting rate is equal to the rate at which said words are shifted in the memory;
an arithmetic unit which receives the words shifted out of memory and which, in response to the video and angular data from the pulse radar apparatus and to the range data provided by the range counter, updates if necessary all information contained in said words with each successive range sweep and, as all information referring to one target has to be concentrated in a single word, transfers the updated information to following or preceding words fetched from memory; and a readout circuit for reading out the word section in which the information has been concentrated together with the range information, in so far as said range information is not contained in said word section.

Before dealing with the operation of the extractor, the quantized video signal applied to the extractor will be considered. First it must be defined what a target looks like to be able to detect it with the aid of the parameter settings and how the irrelevant data of the quantized video signal may be eliminated. The quantized video signal will generally consist of echoes from targets, echoes from clutter (land clutter, sea clutter, meterological clutter), noise, and interferences.

In general a target will be hit several times by a radar pulse, so that several reflections are obtained therefrom. This is due to the beam width of the radar antenna and to the dimensions of the target. The number of hits also varies with the angular speed of the antenna and the distance between the target and the radar. With long-range radars, point targets are usually involved. Point targets are targets whose dimensions are small with respect to the radar resolution cell. With short-range radars, however, allowance must be made for the actual target dimensions.

For each application the minimum and maximum length and width a target can theoretically assume will always be determinable. Hence, an echo will be identified to be from a target only if its dimensions lie within these minimum and maximum values. Through various causes, such as poor receiving conditions and interferences, it may happen that a target does not consist of a continuous series of hits but that interruptions are present in the series of hits. This may adversely affect the detection probability and the measuring accuracy.

Land clutter may be considered to consist of point clutter (church towers and the like) and scattered clutter (buildings, overhead high voltage lines, etc.). Of these kinds point clutter presents the most difficulties, as it often looks like the echo from a target because of its size. Scattered clutter may be blanked or may be eliminated in case one of the maximum values is exceeded.

Sea clutter occurs through reflections against a moving water surface. The time in which echoes are received from the water surface at a given range is called the correlation time. The best way of minimising sea clutter is to take the correlation time of the targets a factor greater than the correlation time of the water surface. The length of the sea clutter received will then be below the minimum length of a target. The foregoing is again dependent upon the dimensions of the target and the angular speed of the antenna. If perforce the correlation time of the water wave is in the same order of magnitude as that of a target, an anticlutter circuit may in some cases achieve improvement. It is clear that sea clutter will adversely affect the false alarm rate.

Meterological clutter (rain, snow, clouds) will usually manifest itself as large echoes of varying strength. If the correlation time is smaller than that of a target, the minimum length will not be attained; however, this will rarely occur. Generally the correlation time of meterological clutter is greater than that of a target, and the maximum length will be exceeded. In both cases however the extractor is capable of eliminating this clutter. If the correlation time is in the same order of magnitude, a further improvement may in some cases be obtained with a polarization change of the antenna. In the case of meterological clutter, the propagation losses will increase, and so will the false alarm rate.

Noise gives uncorrelated "echoes" in the quantized video signal. Since there is no relation whatsoever between two noise echoes, the minimum length of a target will not be attained in general. The probability that noise echoes present themselves as a target will be dependent upon the magnitude of this minimum value.

Also with noise it is found that the false-alarm rate will be increased.

Intentional interference for the purpose of creating the impression that a real target is involved will be difficult to exclude by the extractor. Interference with radiation from other radars will cause interferences in the form of running rabbits, however, through exceeding the maximum limits or failing to attain the minimum limits, as assigned to the dimensions of targets, these interferences can be eliminated.

The digital output data of the extractor are called "plots". A plot contains such information that the position of a target with respect to the radar antenna can be calculated accurately. It also includes information about the size of the target. Moreover, the correct antenna position must be known. Therefore, in view of the determination of the target dimension in azimuth and the target initial and final azimuth values, the instantaneous antenna position is required; in view of the determination of the target initial and final ranges, the instantaneous range count; and in view of the target dimension in range, the number of successive range quants contributing to the build-up of the target. Further, for the purpose of the plot analysis, it is desirable to have the disposal of the number of hits received per range quant.

BRIEF DESCRIPTION OF THE DRAWINGS

The video extractor and its operation will now be described with reference to the accompanying figures, of which:

FIG. 1 is a block diagram of the video extractor;

FIGS. 2A-2L are a number of diagrams useful in explaining how various types of targets are processed in the extractor;

DESCRIPTION OF THE PREFERRED EMBODIMENTS

Figure 3:
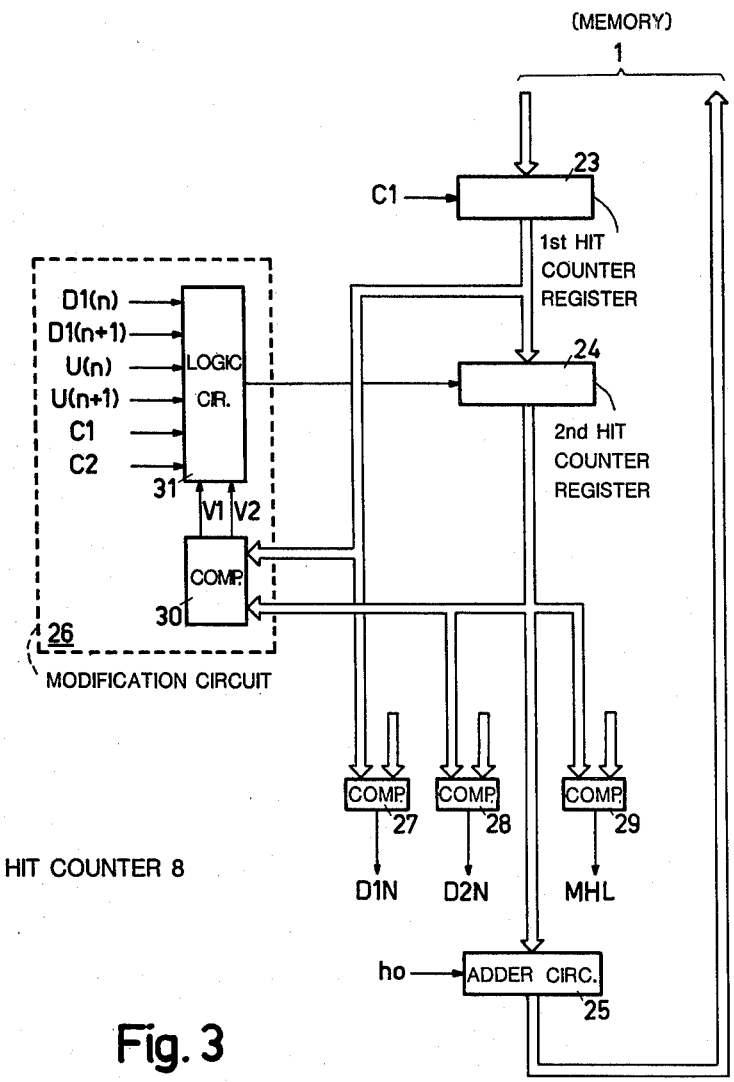
FIG. 3 is a block diagram of a hit counter.

The video extractor, as illustrated in FIG. 1 comprises a memory 1, an arithmetic unit 2, a central control unit 3, a range counter 4, a video input circuit 5, an azimuth data circuit 6, and a readout circuit 7.

In the embodiment here described the memory 1 consists of dynamic shift registers for 1024 words of 85 bits. Of the 1024 words, only 1000 are employed usefully; the 24 words remaining are used for shifting purposes during the "dead time" of the radar. The numbering of the words is recorded in range counter 4. For each range quant a shift pulse is generated for memory 1 and a count pulse for range counter 4; hence, for each range quant one word is available in memory 1. The count of range counter 4 is a direct measure of the distance between a target and the radar. The shifting speed of the memory should be such that after a 1000 steps the maximum radar range selected for the extractor has been reached. This is achieved by means of a clock generator contained in central control unit 3.

In the embodiment in question the 85-bit words are arranged as follows:

(a) 16 bits for the number of hits recorded in a particular range quant; a hit constitutes here that part of quantized video signal that exceeds a selected threshold level and that falls within a range quant;

(b) 12 bits for the number of misses recorded in a particular range quant; i.e. the number of times that no hits have been established in a particular range quant;

(c) 12 bits for the magnitude of the initial azimuth value of the earliest appearing series of hits contributing to the buildup of a target;

(d) 12 bits for the magnitude of the final azimuth value of the furthest extending series of hits contributing to the buildup of a target;

(e) 8 bits for the number of successive range quants, in which hits contributing to the buildup of a target area recorded, counting from the most distant range quant in which hits of the target have been recorded for the longest time;

(f) 8 bits for the number of successive range quants in which hits contributing to the buildup of a target are recorded before the most distant range quant in which hits of the target have been recorded for the longest time;

(g) 10 bits for the initial range of the earliest appearing series of hits contributing to the buildup of a target;

(h) 7 bits used as control bits for the status of various control functions.

To update the aforementioned data stored in memory 1 with each new radar sweep, arithmetic unit 2 comprises a hit counter 8, a miss counter 9, a circuit 10 for determining the initial and the final azimuth values of a target, a first and a second range interval counter 11 and 12 respectively, a circuit 13 for determining the initial range of a target, a control bit recording means 14, and a number of gate circuits 15-21 for erasing the data from the abovementioned counters and circuits comprised in arithmetic unit 2. Arithmetic unit 2 further comprises a circuit 22 for splitting a hit cluster into two separate, target-representing parts. The counters and circuits comprised in arithmetic unit 2 are controlled by clock and conditional signals from central control unit 3, the control bits from control bit recording means 14, and a number of control signals having specific functions. The clock and the conditional signals are applied to the various counters and circuits through line A and the control bits through line B. All control signals will be described with reference to FIGS. 3-11.

Although the design and the functioning of the above counters and circuits comprised in arithmetic unit 2 will be discussed in detail hereafter, first a summary of the major processes performed in these counters and circuits will be given.

The processing of a simple uninterrupted target pattern will be discussed first. This is followed by an example of a broken-up target pattern. Subsequently more complicated target patterns will be discussed, considering further functions of the arithmetic unit.

If in a certain range quant a first hit of a new echo is applied to the extractor, one of the control bits, a recording bit (R-bit), will be set. The R-bit indicates that this particular range quant is occupied. The hit counter of this range quant will then be set to 1. If in the next radar sweep a hit is recorded in the same range quant, the hit counter will be incremented by one unit. This continues until a preset minimum number of hits has been reached; that is, when a target has been detected. The minimum number of hits is called the "detection criterion". Upon meeting this criterion, a detection bit (D-bit) is set high. However, in general the entire length of the target will not have been obtained yet. Hit counter 8 will continue counting until the last hit has been received. In the next radar sweep no hit is received in the particular range quant; this is recorded in miss counter 9. After recording a certain (adjustable) number of misses, the miss criterion is reached and, therewith, the end of the target. Upon meeting the miss criterion, one of the control bits, a miss bit (M-bit), is set high; thereafter the target can be read out, and a readout bit (U-bit) is set high. After readout, all information in the word belonging to the particular range quant is erased.

Figures 2E, 2G, 2H, 2I:
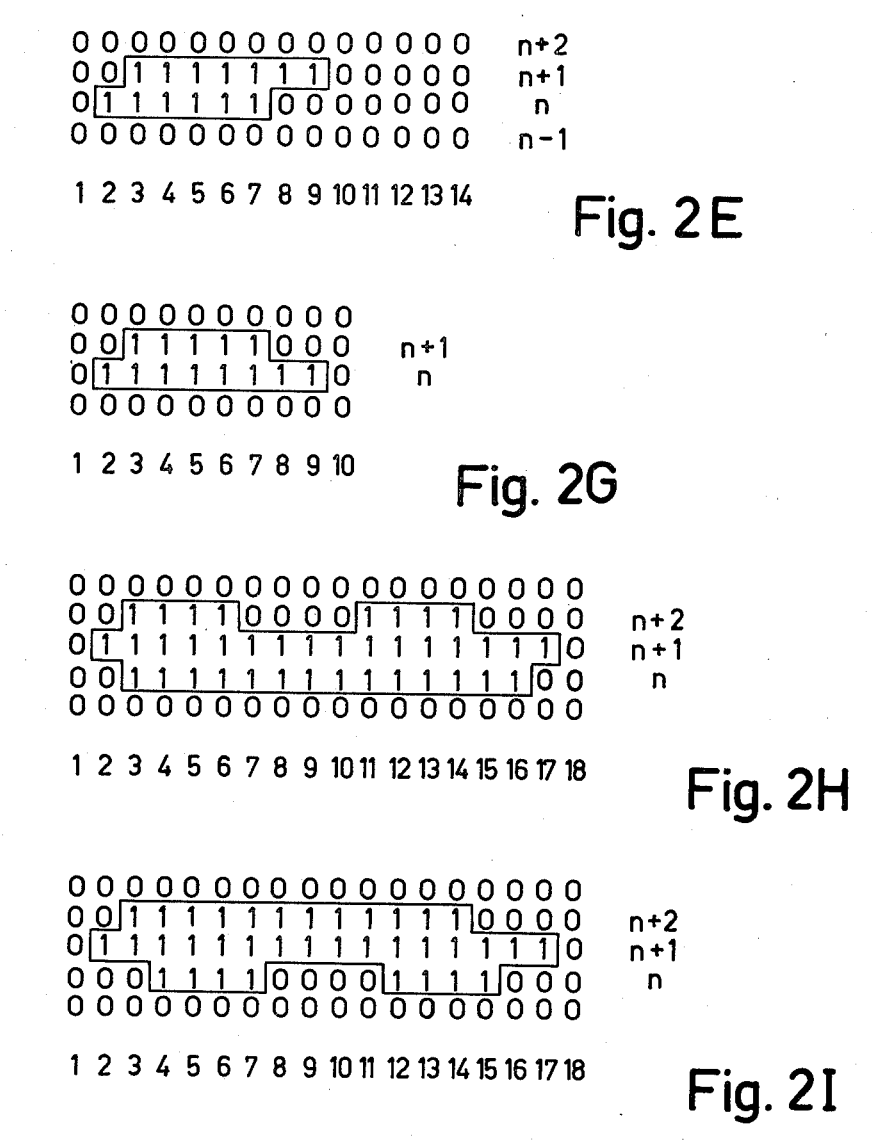

The above is illustrated in the target pattern of FIG. 2A built up of eight hits. Small values were chosen deliberately to prevent the example from becoming too complicated. The detection criterion is set to three hits and the miss criterion to three misses. The target is located in one range quant. From the associated table of FIG. 2B it is seen how in the successive radar sweeps 1-14 the hit count HS, the miss count MS, and the status of the control bits (R, D, M and U bits) are varied.

The example of FIG. 2C shows a broken-up target pattern. Again, the associated table of FIG. 2D shows how in the successive radar sweeps 1-17 the hit count HS, the miss count MS and the status of the control bits (R, D, M and U bits) are varied. It should be noted that in the fifth sweep the miss count MS is decremented by the recording of a hit; the same happens in the 9th and the 13th sweeps. In the 15th sweep the miss criterion is met; in the 16th sweep the information is read out, and in the 17th sweep this information is erased.

In the above it was stated that the target was located in one range quant. There will however be situations in which the target is located in two or more range quants. Such a situation is shown in FIG. 2E. In the first instance a target will be built up in the memory in each range quant separately. However, as soon as for two adjoining range quants the detection bit is high at the same time, it can be positively established that both range quants contribute to the build-up of one target having a range dimension of at least two range quants. Since for the processing of video information it is desirable to have the disposal of the hit count built up by the target, the hit counts in these two range quants should be equalized. As soon as the detection criterion in the two range quants has been reached, the largest hit count is taken for the two range quants, as they belong to the same target. If now in adjoining range quants the detection criterion is again reached, again in all range quants involved the largest of the hit counts already present will be taken, so that this particular range quant will be added to the target as well. To eliminate undesired echoes, the detection criterion will in practice be in the vicinity of the number of hits to be expected. In some cases, however, it may be that a target is not detected if it lies in two or more range quants, as the detection criterion is not reached in any of the range quants. For this reason, it was decided to introduce two different detection criteria; if these are met, the first detection bit (D1-bit) or the second detection bit (D2-bit) of the control bits are set. When the first detection criterion is reached, it must be assumed that a target is probably involved. Adjoining range quants, in which the first detection criterion is reached, are added to the build-up of a target, and the count of the hit counter in these range quants is made equal to the largest count. To arrive at the conclusion that a target is actually involved, the second detection criterion must be reached. A target cannot be detected until reaching this criterion. The advantage of this method is that targets lying in an oblique direction, as shown in FIG. 2E, will still be detected, while small disturbances at the edge of the target pattern will not be counted as belonging to the target.

Since the extractor output is also to contain the target dimension in range, expressed in the number of range quants, the range dimension of every target must be determined. This dimensional information is supplied only with the last word associated with a target. To identify this last word, an identification bit (H-bit) is included in the control bits. If the end of the target pattern is as shown in FIG. 2E, the word associated with range quant n will first meet the miss criterion. Since all relevant information (count in hit counter, range dimension) is contained in the word associated with range quant n+1, the word associated with range quant n can be completely erased. Finally the word associated with range quant n+1 will reach the miss criterion and, because the target pattern is then fully ended, the information can be read out. The table of FIG. 2F shows the processing of the target of FIG. 2E. The lines devoid of a sweep number concern actions performed in between the sweeps. From the table it is again seen how, for both range quant n and range quant n+1, the hit count HS, the miss count MS, the status of the control bits (R, D1, D2, H, M and U bits), and in this case also the range dimension RBS, are varied in the successive sweeps 1-14. It is hereby appropriate to remark as follows. With the 4th sweep the first detection criterion is reached in range quant n, and the range dimension is made 1. With the 5th sweep the first detection criterion is reached in range quant n+1, which is added to the build-up of the target. The range dimension in the word associated with range quant n+1 then becomes 2; the range dimension in the word associated with range quant n is erased, for only the word, identified by the H bit, contains the relevant information. Also the two hit counts are equalized in the 5th sweep. With the 7th sweep the second detection criterion is met in the two range quants. With the 8th and 9th sweeps the count in the hit counter is incremented in range quant n, since the hit count in the two range quants should remain equal, despite the fact that misses are recorded. Since only the last word is to be read out, the word associated with range quant n may be erased when the miss criterion in this range quant is reached.

It is possible that a target, which is of the same order of magnitude as that of FIG. 2E, takes the shape as shown in FIG. 2G. In this case, the word first meeting the miss criterion will not be that associated with range quant n, but the word associated with range quant n+1. The latter word may not simply be erased then, as it contains data not present in the other word of the target. This data must first be placed in the word associated with range quant n; this is termed "relocation" of data and may occur only with one range quant at a time. Therefore, if the miss criterion be reached simultaneously in several range quants at the back of a target, the M-bits will forthwith be set, but the erasure of data will occur for the hindmost range quant only. However, one range quant is to remain for readout. There is one important consequence attached to the relocation of data. The extractor output is to contain the range count of the last word of a target to be able to pinpoint the correct position. If the target data has been relocated, the last word of the target will no longer correspond with the word last present in the memory. In the example of FIG. 2G the word associated with range quant $n+1$ is the last word of a target but the word associated with range quant n is the target word last present. When reading out, only the range count of the word associated with range quant n is available, as the range count of the word associated with range quant $n+1$ has been erased. To pinpoint the correct position, a record must be made of the number of times the word last present has been relocated. This is done in the first range interval counter 11. The count in this counter is placed in the target word last present.

The complication illustrated in FIG. 2H may arise. During the 9th sweep the word associated with range quant $n+2$ will reach the miss criterion. The data in this word will then be relocated in the word associated with range quant $n+1$, and the count in the first range interval counter will be 1. During the 13th sweep however the first detection criterion is again reached in range quant $n+2$, so that the target is again extended. If the first range interval counter were now to retain the count attained, the range dimension of the target, when read out, would be too great, because the same range quant will be counted once more when the miss criterion in this range quant is reached. Therefore, with an extension of the target the first range interval counter will be decremented by 1, setting it back to zero. This provides the correct range dimension, because all relevant data of the target will then refer to the last word of the target.

As already stated, the range dimension of the target in the output appears in the form of a number of range quants. Therefore, when reaching the miss criterion at the front side of the target, a record must also be made of the number of times a word is erased. This is done in the second range interval counter 12. If after erasure a target is again extended at the front side, as shown in FIG. 2I, the second range interval counter, if not already 0, will be decremented by 1 with each target extension at the front. Also the count in the second range interval counter is included in the target word last present.

Combinations of the cases discussed above are possible. The actual range dimension of the target is therefore determined by the sum of the two range counts plus 1, because the range quant containing the word last present has not been counted yet.

Hitherto only the processing of a single target was considered; in normal cases this is sufficient. There may however be situations in which the presence of two or more targets in close proximity impede the video processing in the extractor. So long as two targets are stored in memory in such a way that they do not influence each other, they are each processed as one target, and all of the above is applicable. A different situation is obtained if these targets do influence each other, as in the case of the merging of targets or splitting of a target into two parts.

Figures 2J, 2K, 2L:
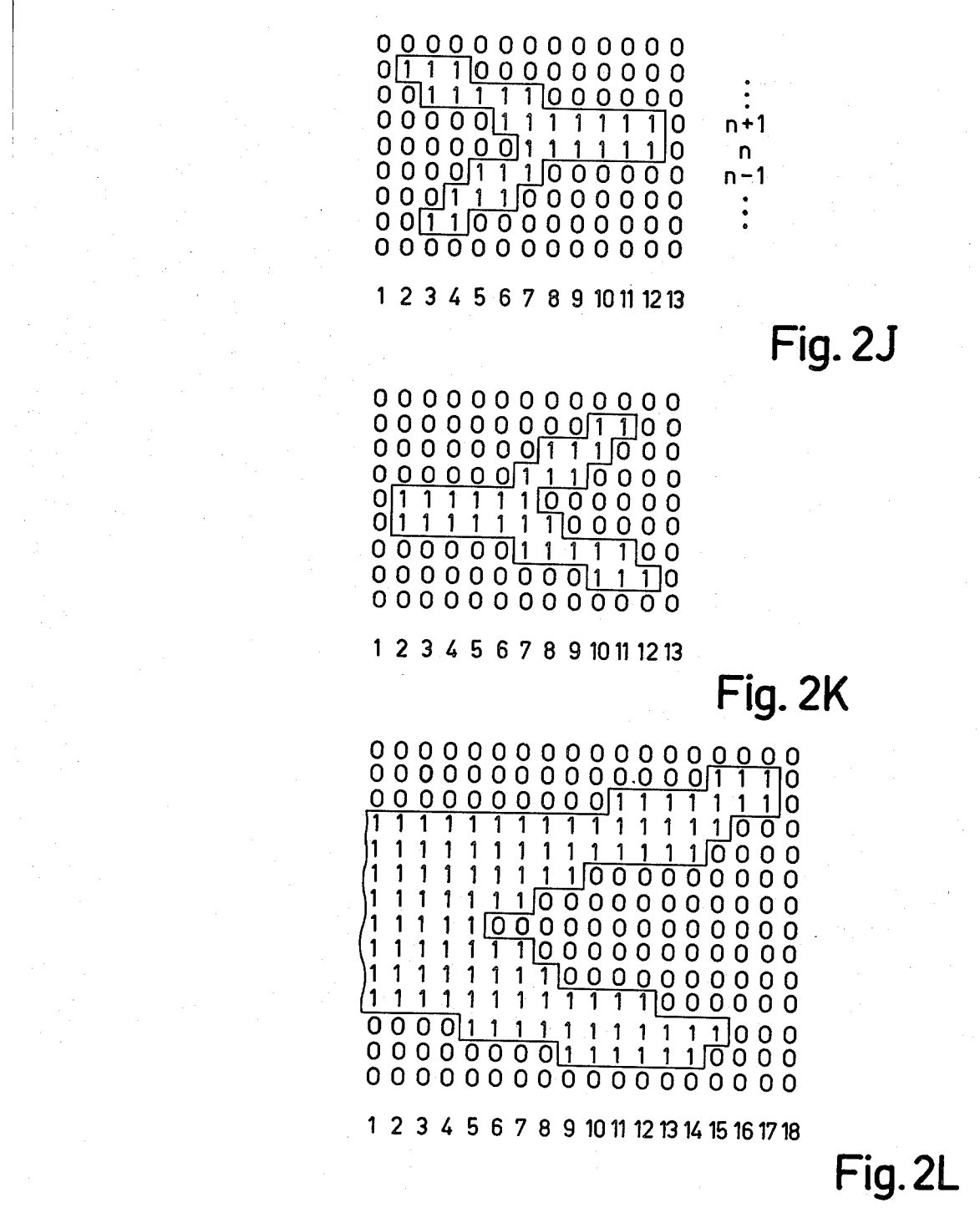

First a target as shown in FIG. 2J will be considered. In the first instance, i.e. up to and including the 6th sweep, the memory contains two targets fully independent of each other. Each of these targets has its separate hit count and range interval count. FIG. 2J shows that with the 7th sweep the two targets have merged into one target, of which all data have to be collected in the last word. To determine the total dimension of the target in azimuth, it must be ensured that the largest hit count is taken. Not until the first detection criterion in range quant n has been reached, will the hits recorded in the various range quants will be treated as one target. Then count in the first range interval counter of the first original target will be lost, and that of the second original target will be retained for the new target. The reverse applies to the count of the second range interval counter. That of the first original target will be retained, and that of the second original target will disappear. In any case, this enables determination of the total dimension of the new target in range, which is again the sum of the range interval counts retained plus 1.

Splitting is not done in this case, at least not for valid targets. In the case of a hit cluster as shown in FIG. 2J, it will appear in the output as one target. In the case of a hit cluster as shown in FIG. 2K, resulting in a splitting of this cluster, the output will produce two targets. The antenna direction would then determine whether the same hit cluster produces one or two plots; this has to be rejected as being inconsistent. In the embodiment in question one target was chosen. The disadvantage of this choice is that the extractor will overlook a small area comprised in the target pattern. This disadvantage is not significant because the probability that another target is enclosed in this area is very small. The area which cannot be scanned is called the "shadow area". As will be described hereinafter, splitting of a hit cluster does occur with larger clutter areas.

The extractor comprises a number of adjustable parameters to suppress undesired echoes; this is of course possible only if the correlation time of the undesired echoes differs clearly from that of a target. The major parameters are: the detection criterion, the maximum count in the hit counter, the minimum range dimension, and the maximum range dimension. The detection criterion and the minimum range dimension determine the minimum length and width of a target. The remaining two parameters determine the maximum length and width of a target. If an echo fails to comply with these parameters, the extractor will decide that it is not dealing with a target. The parameter settings are strongly dependent on the type of radar, the target dimensions, the rotational speed of the antenna, the antenna beam width, the pulse repetition frequency of the radar, etc.. The parameter settings must be considered and established for each ease individually.

The foregoing description referred to the miss counter and the miss criterion. If a target was located and at the end thereof misses were recorded, these misses were counted in the miss counter. After recording a preset number of misses, the miss criterion was reached and the next readout or erasure of the relevant word ensued. This is hereinafter referred to as "miss criterion after detection" to distinguish it from the following. It is also possible that misses are recorded when the second detection criterion has not yet been met. This will occur if the echo fails to reach the minimum number of hits. If then the socalled "miss criterion before detection" is reached, the word will be erased. There are two possible ways to delay such an erasure, so that even weak echoes are still detected as a target.

If, prior to reaching the miss criterion before detection, another hit appears, it is possible either to increment the hit count by 1 and to erase the miss count or to increment the hit count by 1 and to decrement the miss count by 1. The choice of these possibilities depends on the nature of the quantized video signal and the magnitude of the parameters. It should be noted that the miss criterion before detection has a favorable effect in eliminating undesired echoes from noise, interferences and in certain cases water clutter and rain.

Concerning the undesired echoes three situations may arise: the echo fails to reach the fixed minimum values, the echo exceeds one of the fixed maximum values, and the echo is above the minimum but below the maximum value. In the latter case no distinction can be made from a target, and a normal output of the plot follows.

The adjustable parameters include the minimum range dimension. For close targets these dimensions are always located in a minimum number of range quants. If this is so, echoes of too small a magnitude can be excluded by a minimum setting of the range dimension. Therefore, echoes of too small a magnitude are not detected by the extractor.

It is also possible that an undesired echo manifests itself in the first instance as a target. Hence a detection will ensue. The echo is however of such a magnitude that the maximum preset hit count and/or the maximum preset range dimension will be exceeded. In such a case the extractor processes this echo as a target, but there will be no readout; after termination the echo will be erased. Echoes of a too large a magnitude are therefore eliminated by the extractor. For certain measurements it may be desirable to output this type of echoes. This may be effected by means of a switch. In this case, it must be determined externally from the extractor that the echo is too large. Echoes exceeding one of the maximum values may originate from land clutter and in certain cases from water clutter and meteorological clutter.

The result of the merging of two targets has already been described. It was tacitly assumed that the sum of the range interval counters (plus 1) and the largest hit count would still be subject to the criteria applicable to a target. If this is not so and one of the maximum settings would thus be exceeded through the merging, the target will be dealt with as stated hereinbefore. After the termination of the echo it will be seen that no target was involved, but an undesired echo, so that normally the data will be erased. It may occur that an echo splits into two parts, as shown in FIG. 2L. In such a case it may be that the shadow area becomes very large, and the probability that this area contains a target increases. Splitting however occurs only if the number of range quants of the shadow area is at least as large as the preset maximum range dimension for a target; a separate splitting criterion is present. With the splitting of an echo cluster it is ensured that the two echoes produced obtain the same hit count. These echoes, of which the original hit cluster had an excessively large range dimension, must be erased afterwards. For this reason a splitting bit (S-bit) is added to the two echoes. For certain applications it may be desirable to read out the two echoes. In such a case the S-bit is included in the readout to establish that the echoes originated from a hit cluster. Before splitting, the words having reached the miss criterion after detection are counted. The count in the counter used for this purpose is compared with the maximum range dimension and, on exceeding this maximum value, splitting occurs. Next, the last word of the front echo must be determined, as this word is to contain the relevant data of this new echo. These data are at this moment still in the last word of the second echo, which was the last word of the original hit cluster before the splitting. After splitting, the data must be stored and added to the last word of the front echo. The splitting can be effected by erasing all words having reached the miss criterion after detection in the shadow area; thereafter the memory contains two echoes.

In the foregoing description of the operation of arithmetic unit 2, the target and the operation of the various registers and counters were considered. Also the function of the control bits was discussed. With reference to the parameters it was shown how the extractor deals with a target and undesired echoes. The following is a detailed description of the component parts of the arithmetic unit. It will be explained how the various functions are technically achieved.

Referring to FIG. 1, it should be noted that the signals applied to the extractor are produced by the quantized video signal recorded in video input circuit 5 and by the antenna azimuth data. The azimuth data circuit 6 stores the instantaneous antenna azimuth position, indicated by bits $\phi N1-8$. Both the video input circuit 5 and the azimuth data circuit 6 are connected with arithmetic unit 2. The data collected in the arithmetic unit can be output in two ways. The target echo can be presented on a display, where it is provided with an identification label as soon as the extractor has detected a target. The target data may also be processed electronically, either directly by a computer, or by storing the data on a magnetic tape for later processing. Both methods require a separate approach. In the first case, the process must be performed on a real-time basis. On the termination of a target, the extractor immediately delivers a signal to the display. Such a readout method is the simplest, because on the appearance of a plot the display is at the same range scale as the extractor and indicates the instantaneous antenna position. However, dimensional data of the target is not available. In the second case, all relevant data is placed in a readout register, viz. the hit count, the count of the two range interval counters or the count of one of the two range interval counters with the total range dimension, the initial and final ranges, and the initial and final azimuth values. The readout register forms part of the readout circuit 7. The device connected to the output of the extractor takes delivery of the above data. The initiative for the actual readout can be taken by either the extractor or the device connected to the extractor output. In the latter case, it is possible that a new plot appears while the readout register has not been completely read out. In such a case the new plot is not to be put in the readout register, but is to remain in the memory. Since the target data will then be stale as concerns the position, a counter is to record the number of sweeps the target has been stored in memory after it should have been read out. Since the miss counter is no longer used for a target that has ended (recognisable by the U-bit being high), this counter is used to count the so called holding sweeps, and is called the readout counter. With the readout, the count in the readout counter is output as well, permitting the calculation of the real antenna position by a computer at the instant of termination of the target.

Besides the readout register, the readout circuit 7 also comprises a number of logic circuits which determine the conditions under which the particular information may be read out. These conditions include among others, the aforementioned minimum and maximum range dimensions of targets and the maximum number of hits.

Readout register 7 further comprises the aforementioned switch to effect read out, if desirable, of echoes of excessive magnitude. It should be noted that readout circuit 7 is connected with arithmetic unit 2 and range counter 4. The latter delivers the final range of echoes directly to the readout register.

The following describes in detail the component parts of the arithmetic unit and their functioning in conjunction with the remaining units of FIG. 1.

The hit count in the word stored in memory 1 for the particular range quant may be incremented or otherwise modified in hit counter 8. FIG. 3 shows a practical embodiment of such a hit counter. The hit counter comprises two hit counter registers 23 and 24, an adder circuit 25, a modification circuit 26, and three comparators 27, 28 and 29 to compare the hit count with certain criteria.

If the hit counts fetched from memory 1 for the successive range quants need not be modified other than by incrementing, they are written successively into hit counter registers 23 and 24 at a frequency determined by the C1 clock pulses and, if necessary incremented by 1, returned to memory 1. That is, the hit count in hit counter register 23 represents the number of hits recorded in range quant n+1 and the count in hit counter register 24 the number of hits recorded in range quant n, where n is a running index, indicating the successive range quants in which the range is divided.

With each hit received in the particular range quant, as indicated by the ho signal, the hit count in adder circuit 25 is incremented by 1, if this circuit has not attained its maximum count.

As already stated, the hit count for each range quant is compared with certain criteria. In comparator 27 the hit count is compared with the first detection criterion. As soon as a minimum number of hits are recorded in a range quant, comparator 27 delivers the D1N signal. In comparator 28 the hit count is compared with the second detection criterion. If compliance with the first detection criterion indicates that presumably a target is present in the particular range quant, compliance with the second detection criterion will make certain of this presumption. As soon as the second detection criterion has been met, comparator 28 delivers the D2N signal. In comparator 29 the hit counter is compared with the maximum length criterion. This will be met when the hit counter has reached a maximum value. The hits in the particular range quant are then considered not to belong to a target, but to form part of a clutter area. As soon as the maximum length criterion has been met, comparator 29 delivers the MHL signal. The D1N, D2N and MHL signals delivered by comparators 27, 28 and 29 function as control signals for other circuits in the video extractor and are discussed hereafter.

The setting of the two detection criteria and the maximum length criterion is dependent on the concrete application of the video extractor. For all targets the number of echoes that may be expected and hence the number of hits in the range quants involved in the various ranges can be determined by means of the beam width, the antenna rotational speed and the pulse repetition frequency of the radar in which the video extractor is applied. Depending on the number of target echoes to be expected, a second detection criterion can be established for each of the ranges. The first detection criterion should of course be of a smaller magnitude than the second, and should be so chosen that the number of undesired echoes counted to the target is minimal. The number of echoes to be expected is also determinative for the maximum length setting.

In the case of recording a number of hits in two successive range quants n and n+1, it is assumed that the hits in these range quants belong to the same target as soon as the first detection bit in the two range quants is high, i.e. as soon as at a given instant the first detection criterion has been met in both range quants. Since it is desirable for the video data processing to have the disposal of the hit count accumulated by a target, the hit counts for range quants n and n+1 should be equalized and kept equal. If subsequent hits in adjoining range quants are believed to belong to the target and the number of hits meets the first detection criterion, the hit count in all range quants involved must also be made equal to the largest hit count of those present for the particular range quants.

If the number of hits in range quant n is greater than that in range quant n+1, the hit count of range quant n+1, present in register 23 at that instant, must be replaced with that of range quant n, present in register 24 at that instant. This does not occur by transferring the contents of register 24 back into register 23, as with the next C1 clock pulse the contents of register 23 has to be shifted back into register 24. The equalization of hit counts is in this case achieved by preventing transfer of the contents of register 23 to register 24 during the clocking of the hit counts on the occurrence of the C1 clock pulse. The original contents of register 24 will be put back in memory, and will also remain in register 24. The original contents of register 23 will be lost and replaced by the original contents of register 24. The clock pulse effecting writing into register 24 should therefore be suppressed.

If the number of hits in range quant n is smaller than that in range quant n+1, the contents of register 24 must be replaced with that of register 23 before the contents of register 24 are put back into memory. For this reason the C2 clock pulse is generated between the appearance of two successive C1 clock pulses. The C2 clock pulse initiates the operations to be performed between the clocking of the data flow from and to memory 1.

Modification circuit 26 provides for the equalization of the hit counts as described above. This circuit comprises a comparator 30 and a logic circuit 31. Comparator 30 is connected to registers 23 and 24 and produces two signals V1 and V2; signal V1 is generated when the contents of register 24 is greater than that of register 23, and V2 when the contents of register 24 is smaller than that of register 23. The V1 and V2 signals are applied to logic circuit 31, which delivers the following clock signal, given in Boolean form, to register 24:

$$D1(n).D1(n+1).\overline{U(n)}.\overline{U(n+1)}.C2.V2 + D1(n).D1(n+1).\overline{U(n)}.\overline{U(n+1)}.V1.C1,$$

where $D1(n)$ and $D1(n+1)$ indicate that the first detection criterion has been met in, respectively, range quant n and n+1, and $\overline{U(n)}$ and $\overline{U(n+1)}$ that the words containing the data about range quants n and n+1, respectively, are not ready to be read out.

In case $V1=1$ and hence $V2=0$, the above clock signal becomes zero, provided that $D1(n).D1(n+1).\overline{U(n)}.\overline{U(n+1)}=1$, and the contents of register 23 are not transferred to register 24.

In case V2=1 and hence V1=0, the above clock signal becomes equal to C2+C1, provided that D1(n).D1(n+1).U(n+1)=1, and the contents of register 23 are transferred to register 24 before the contents of the latter register are put back into memory with the next C1 clock pulse.

Figure 4:
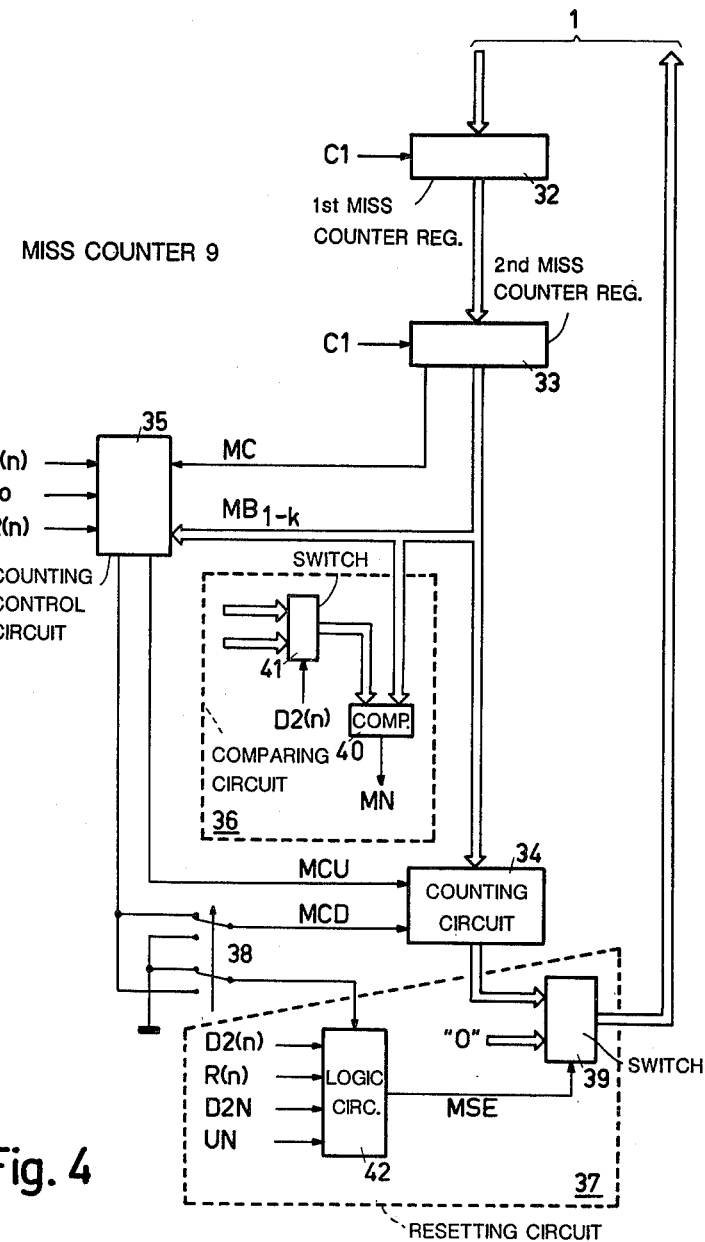
FIG. 4 is a block diagram of a miss counter.

The miss count, forming part of the word stored in memory 1 for the particular range quant, is recorded in miss counter 9. FIG. 4 shows a practical embodiment of such a miss counter. The miss counter comprises two miss counter registers 32 and 33, a counting circuit 34, a counting control circuit 35, a circuit 36 to compare the miss count with a given miss criterion, and a circuit 37 to reset the miss counter. The miss counter can be operated in two modes by means of switch 38.

The miss counts fetched from memory 1 for the successive range quants are written into miss counter registers 32 and 33 at a frequency determined by the C1 clock pulses and, after incrementing or decrementing by 1 if necessary, are returned to memory 1 via switch 39 forming part of circuit 37. That is, the miss count in miss counter register 32 is representative of the number of misses recorded in range quant n+1 and the miss count in miss counter register 33 the number of misses recorded in range quant n, where n is a running index, indicating the successive range quants into which the range is divided.

With each miss recorded in the particular range quant, i.e. no hit is received, while previously one or several hits were recorded in this range quant, the miss count in counting circuit 34 is incremented by 1, if this circuit has not yet reached its maximum value. Such incrementing is effected by the MCU signal from counting control circuit 35, which signal is given in Boolean form as MCU=$\overline{ho}$.R(n).$\overline{Mc}$.$\overline{U(n)}$, where $\overline{ho}$ indicates that no hit was received, R(n) that already one or several hits were recorded in range quant n, $\overline{MC}$ that register 33 has not yet reached its maximum value, and $\overline{U(n)}$ that the word containing the data about range quant n is not ready to be read out.

As already stated, the miss count for each range quant is compared with a given miss criterion. Such a miss criterion is reached if a minimum number of misses is recorded in a range quant. On recording this minimum, comparator 40 forming part of circuit 36, produces the MN signal. This signal, functioning as control signal for other circuits in the video extractor, will be further dealt with hereafter.

In the miss counter of FIG. 4, two miss criteria are employed, viz. the miss criterion before detection and the miss criterion after detection. The D2(n) signal, indicating that in the particular range quant the second detection criterion has been met, acts on switch 41, forming part of circuit 36, to pass one of these two miss criteria to comparator 40. The miss criterion before detection must be so chosen that, on the one hand, undesired echoes will not occupy the particular range quant for too long a period and that, on the other hand, small disturbances incurred with the receipt of a target will not cause this target to be erased. The miss criterion after detection must be so chosen that, on the one hand, a small disturbance does not cause the target to end and that, on the other hand, not too large a shadow area is developed behind the target. The two miss criteria must be established in accordance with the concrete application of the video extractor. It will be obvious that also a single miss criterion can be employed, although this will not guarantee optimal video processing in most cases.

If in a certain range quant, after the recording of a series of hits, the second detection criterion is met and if then at a given instant no hits, but misses are recorded, these misses will be counted; after a certain number of misses the miss criterion after detection will have been reached. It is however possible that misses are already recorded before reaching the second detection criterion. If subsequently the miss criterion before detection is met, the word associated with the particular range quant can be erased. As already stated, the miss counter can be operated in two modes by means of switch 38; these modes offer two possibilities to delay the erasure action. If after the recording of one or several misses but prior to reaching the miss criterion before detection, another hit is recorded, the miss counter can be decremented by 1 or be reset. The effect thereof is that certain weak echoes, which otherwise would be erased, can still be detected as coming from a target.

In the first mode of operation of the miss counter, switch 38 is in the position as shown in FIG. 4. The MCD signal produced in this mode by counting control circuit 35 causes the miss count in counting circuit 34 to be decremented by 1, provided that this circuit is not already 0. The MCD signal in Boolean form is:

$$MCD = R(n).\overline{U(n)}.ho.(MB1+MB2+ \ldots +MBk),$$

where R(n) indicates that one or several hits were already recorded in range quant n, $\overline{U(n)}$ that the word containing the data about range quant n is not ready to be read out, ho that a hit is received, and MB1+MB2+ ... +MBk that the miss count of k bits in the miss counter register 33 is not 0.

In the above mode, logic circuit 42 forming part of circuit 37 produces the MSE signal, which is represented in Boolean form by:

$$MSE = \overline{R(n)} + UN + \overline{D2(n)}.D2N.$$

If MSE=0, the miss count can pass through switch 39 and counting circuit 34 for storage in memory 1. If MSE=1, the miss counter is reset, i.e. switch 39 passes zeroes only, so that only zeroes are stored at the particular memory locations. The resetting of the miss counter occurs in three instances: if no hits have been received, R(n)=0; if the miss criterion has been met and the word containing the information about the particular range quant can be read out with the next radar sweep, UN=1; and if $\overline{D2(n)}$.D2N=1. The latter reset condition implies that the second detection criterion has not been met, D2(n)=0, but that it will be reached with the last radar sweep, D2N=1. The latter signal is produced directly by the hit counter, see FIG. 3. That is, so long as the second detection criterion has not been met, the miss counter is not reset in this mode, but only decremented by 1, provided that the above required conditions are fulfilled. At the instant of meeting the second detection criterion; D2N=1 and D2(n)=0, MSE=1 and the miss counter is reset; hence, the miss criterion after detection should be reached, irrespective of any misses recorded before reaching the second detection criterion. It will be obvious that, after meeting the second detection criterion, MSE=0, i.e. the miss counter is not reset, but can be decremented if necessary.

In the second mode of operation of the miss counter, switch 38 is in the position not shown in FIG. 4. In this mode the miss count cannot be decremented, MCD=0. The signal produced by circuit 42 can be represented by:

$$MSE = \overline{R(n)} + UN + \overline{D2(n)}.D2N + R(n).\overline{U(n)}.ho.\overline{D2(n)}.[MB1 + MB2 + \ldots MBk].$$

This reset condition for the miss counter differs from that produced in the first mode by the last term. This term achieves that, so long as the second detection criterion has not been reached, the same condition applied in the first mode to decrement the miss counter now, i.e. in the second mode, resets the miss counter.

The antenna position of the radar, in which the video extractor is applied, is determined by the azimuth angle the antenna makes with a fixed reference point, usually geographic north. This angle is recorded in azimuth register 6. The desired azimuth value can be transferred from this register to the video extractor. Register 6 is adjusted at the start of each new radar sweep, giving the same angular value for the entire sweep. The angular value in binary notation, as applied to circuit 10 to determine the initial and final azimuth values of the target is $\phi N1 - k$.

At the instant the video extractor receives a first hit of a new echo, the initial azimuth value of this echo has to be determined. This is done by placing at that instant the contents of register 6 in the memory. The initial azimuth value is kept in memory 1 until the word, of which the initial value forms a part, is erased. The initial azimuth value remains of course coupled to the last word of the target, as this word always contains all relevant information about the target.

On the detection of a target, the contents of azimuth register 6 are to be placed in memory 1 with each radar sweep in order that the final azimuth value of the target is determined at the instant the target has been fully recorded. This final value, adapted if necessary with each radar sweep, remains in memory 1 until the relevant word is erased.

Figure 5:
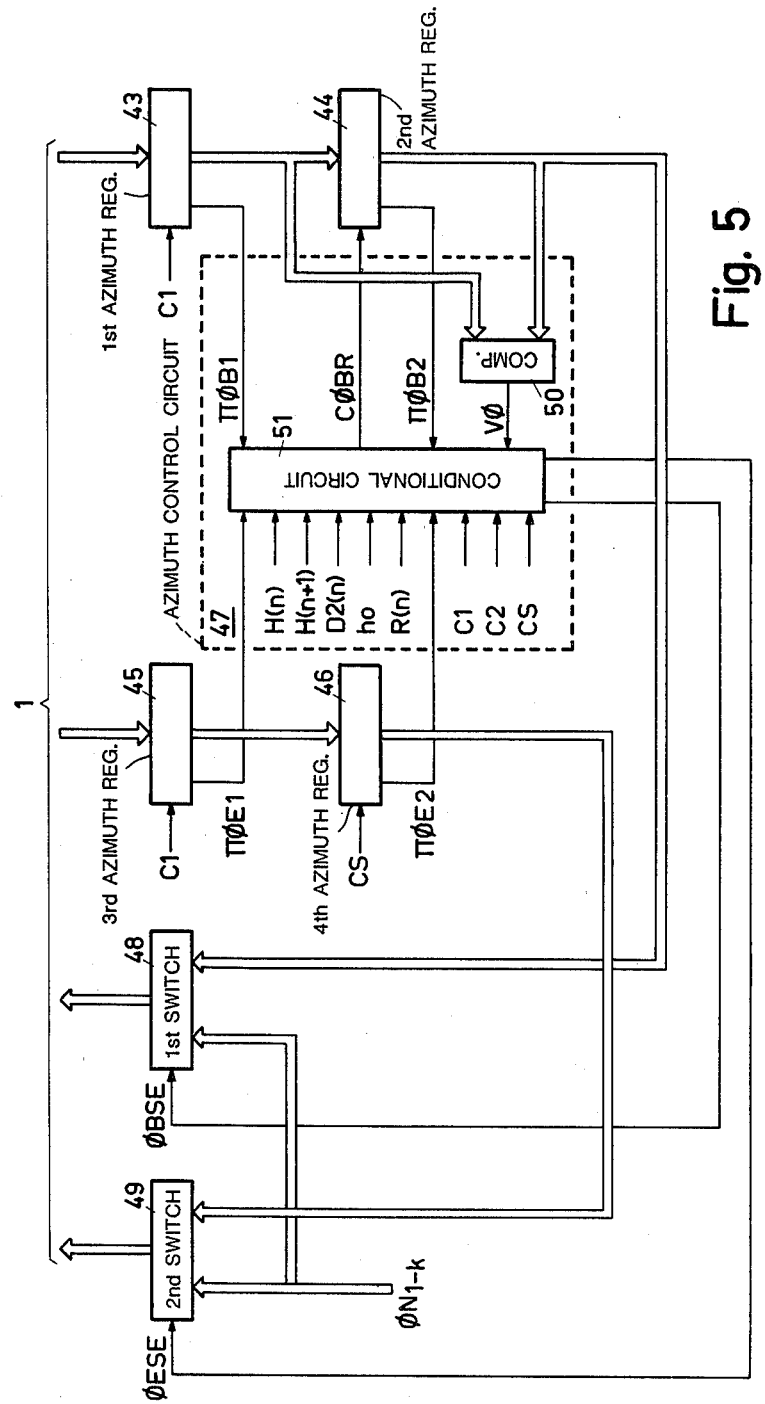
FIG. 5 is a block diagram of a circuit for determining the initial and the final azimuth values of a target.

FIG. 5 shows a practical embodiment of a circuit suitable for determining the initial and final azimuth values of the target and for modifying, if necessary, the initial value. This circuit comprises two initial-azimuth registers 43 and 44, two final-azimuth registers 45 and 46, an azimuth control circuit 47 and two switches 48 and 49. Azimuth control circuit 47 comprises a comparator 50 and a conditional circuit 51.

As soon as the video extractor records a hit of a new echo in range quant n, the recording bit R(n)=1; however at the instant of receiving a first hit of a target, R(n)=0. Under condition $\overline{R(n)}.ho$ the conditional circuit 51 supplies the $\phi$BSE signal for a period determined by the C2 and the following C1 clock pulses. The $\phi$BSE signal acts on switch 48 to pass the azimuth value $\phi N1 - k$, applied to the video extractor, to memory 1. After placing the memory-stored azimuth value at the appropriate position in the word associated with the particular range quant, it is transferred during each radar sweep from memory 1 to the initial-azimuth registers 43 and 44 successively, and from there, modified if necessary, returned to the memory via switch 48. That is, the value in initial-azimuth register 43 is representative of the magnitude of the initial azimuth associated with a number of hits recorded in range n+1, and the value in initial-azimuth register 44 representative of the magnitude of the initial azimuth associated with a number of hits recorded in range quant n, where n is again the running index, indicative of the consecutive range quants dividing the range. As in the case of the hit count and the miss count, the initial azimuth is written from memory 1 into registers 43 and 44 successively at a frequency determined by the C1 clock pulses, and returned to the memory, unless through a modification to be performed on the initial azimuth the transfer from register 43 to register 44 has to be skipped or is to occur at an instant determined by the C2 clock pulses, in between two successive C1 clock pulses.

As soon as the second detection criterion D2(n)=1 has been met in the last range quant in which hits of a target have been recorded, which range quant is distinguished by H(n)=1, the azimuth value $\phi N1-k$ must be transferred from azimuth register 6 to the memory and, if necessary, be adapted with each new radar sweep until the end of the target; this azimuth value is representative of the magnitude of the final value. The conditional circuit 51 supplies the $\phi$ESE signal under the condition D2(n).H(n).ho for a period determined by the C2 and the following C1 clock pulses. The $\phi$ESE signal acts on switch 49 to pass the azimuth value $\phi N1-k$, applied to the video extractor, each time the above condition is met. After placing the memory-stored azimuth value at the appropriate location in the word associated with the particular range quant, it is transferred, like the initial value, from the memory to final-azimuth registers 45 and 56 successively, and from there, modified if necessary, returned to the memory, provided that no new value in the azimuth register is to be stored in the memory.

As already stated, the initial azimuth is to be modified under certain conditions. This is achieved by either skipping for one time the transfer of the particular information, if contained in register 43, to register 44, or transferring it to the latter register before the return of the contents of register 44 to the memory. In the first case the initial azimuth in range quant n+1 is replaced with that in range quant n, and in the second case the initial azimuth in range quant n is replaced with that in range quant n+1. The C$\phi$BR clock signal, applied to register 44 and used for the modification of azimuth values can be represented in the following Boolean form:

$$C\phi BR = CS + H(n).H(n+1).[\pi\phi B1.\overline{\pi\phi B2}.\overline{\pi\phi E1} + \overline{\pi\phi B1}.\pi\phi B2.\pi\phi E2.V\phi].C1,$$

where $$CS = [DS + \overline{H(n)}].C1 + THV.\overline{H(n)}.C2.$$

The CS signal, like the other clock signals (C1 and C2), is supplied by the central control unit 3.

If data for a target is recorded in range quant n+1 and the miss criterion has been met in this range quant, while in range quant n data of this target has been recorded for a longer period than in range quant n+1, the data about range quant n+1 must be relocated in the word associated with range quant n. As a consequence of this relocation, the word associated with range quant n may be considered to be the last word as it contains all relevant information about the target. This relocation of data occurs under the condition THV=1.

In the case of relocation of data about range quant n+1, H(n)=0 and H(n+1)=1, as the H bit is high only for the last word of a target. This last word is the word of range quant n+1 whose contents is to be relocated. As will be explained with reference to the range interval counters, under these conditions DS=1 and C$\phi$BR=C1+C2. The contents of register 43 are therefore transferred to register 44 with the C2 clock pulse before the return of the contents of the latter register to the memory with the next C1 clock pulse. That is, the initial azimuth of range quant n+1 is relocated in the word associated with range quant n; in the same way, with the relocation of data, the final azimuth is modified on the presence of clock signal CS=C1+C2. Relocation of data always occurs when the end of the target has not yet been reached in one of the preceding range quants. The word being relocated does not contain the final azimuth of a target, nor does the word in which the data are placed. But this is of no concern since in such a situation the switch 49 passes the correct final azimuth value $\phi$N1−k, recorded externally, to the memory. In this way the last word of a target always contains the correct final azimuth value, even if relocation occurs. If hits of a target have been recorded in range quant n+1 before hits of the target are established in range quant n, and if the word associated with range quant n+1 must be relocated, the word associated with range quant n will receive the correct initial azimuth. However, if the word associated with range quant n+1 need not be relocated, this word and therewith the correct initial azimuth will be read out. In case hits of a target have been recorded in range quant n before hits of the target are established in range quant n+1, the word associated with range quant n contains the correct initial azimuth. If the word associated with range quant n+1 were to be read out, the wrong initial azimuth would be assigned to the target; if this word were to be relocated, the word associated with range quant n would receive the incorrect initial azimuth. To avoid such an error, the initial azimuth values must be made equal to each other, that is the initial azimuth in the word associated with range quant n should be placed in the word associated with range quant n+1, or the transfer of the contents of register 43 to register 44 should be skipped for one time. This operation occurs as soon as the first detection criterion has been met in range quant n+1 as well, but before the H bit of the word associated with range quant n+1 goes high; at this instant H(n)=1 and H(n+1)=0; while of course THV=0. The C$\phi$BR signal will then be DS.C1. However, as will be found hereafter, under these conditions signal DS=0, causing C$\phi$BR to be 0 and the transfer of the contents of register 43 to register 44 will be skipped for one time. As already stated, the DS signal will be discussed in detail later in the description.

It may happen that in the first instance two targets are detected, while these targets afterwards merge into one cluster. The last word of these two targets contains the data relevant to these targets. After merging of the targets, the contents of the lower-numbered word of these two words will be shifted through until all information has landed in the last word of the merged cluster. Just before this, the situation arises that H(n)=1 and H(n+1)=1, i.e. the word associated with range quant n contains the shifted data of the part of the merged hit cluster, which part was originally presumed to be a target nearest to the radar, while the word associated with range quant n+1 contains the data of the part of this cluster presumed to be a more distant target. At this moment the initial azimuth value to be assigned to the merged cluster must be determined. With the merging of targets there is the moment when H(n)=H(n+1)=1, and since DS and THV are then 0, C$\phi$BR=[$\pi\phi$B1.$\overline{\pi\phi B2}$.$\pi\phi$E1+$\overline{\pi\phi B1}$.$\pi\phi$B2.$\pi\phi$E2.V$\phi$].C1.

In practically all cases the smallest initial azimuth of the merged hit cluster should be given. However, problems arise if the words associated with range quants n and n+1 contain series of recorded hits with initial azimuth values on both sides of the axis, normally the north axis, with respect to which the angles are measured. The azimuth control circuit 47 contains a comparator 50 which produces a signal V$\phi$=1 when the initial azimuth in register 43 is smaller than that in register 44, and a signal V$\phi$=0 when the initial azimuth in register 43 is equal to or greater than that in register 44. Depending on both the V$\phi$ signal and the 180° bits of registers 43 to 46, viz. $\pi\phi$B1, $\pi\phi$B2, $\pi\phi$E1 and $\pi\phi$E2 respectively, the C$\phi$BR clock signal is made equal to zero or to C1.

If the 180° bits of the initial azimuth angles are equal, i.e. $\pi\phi$B1.$\overline{\pi\phi B2}$=0 and $\overline{\pi\phi B1}$.$\pi\phi$B2=0, then C$\phi$BR=V$\phi$.C1 and, depending on V$\phi$, the transfer of the contents of register 43 to register 44 will be skipped for one time, or will take place before the return of the contents of register 44 to the memory. In this way the largest initial azimuth is made equal to the smallest azimuth. If $\pi\phi$B1=1 and $\pi\phi$B2=0, so that V$\phi$=0, the initial azimuth angles may be on both sides of the 0° axis (north axis) or on both sides of the 180° axis. In the first case, the smallest initial azimuth should be made equal to the largest initial value; in the second case the largest initial azimuth equal to the smallest value, as above. If $\pi\phi$B1=0 and $\pi\phi$B2=1, so that V$\phi$=1, the initial azimuth angles may be on both sides of the 0° axis or on both sides of the 180° axis. In the first case, the smallest initial azimuth must again be made equal to the largest initial value, and in the second case the largest to the smallest value. In the cases when $\pi\phi$B1=1; 1 and $\pi\phi$B2=0, C$\phi$BR=$\pi\phi$E1.C1, and when $\pi\phi$B1=0 and $\pi\phi$B2=1, C$\phi$BR=$\pi\phi$E2.C1. The difference between the situation in which the initial azimuth angles are on both sides of the 0° axis and the situation in which these angles are on both sides of the 180° axis is therefore determined by the 180° bit of the final azimuth angles. Depending on the 180° bit, C$\phi$BR=0 or C$\phi$BR=C1, and the aforementioned modifications of the initial angle are carried out.

If a target is detected in range quant n and the number of hits subsequently recorded in range quants n+1, n+2, ..., n+p and n−1, n−2, ..., n−q is such that these range quants must also be considered to belong to the target, the total range interval of the target covers p+q+1 range quants. By means of two range interval counters the p range quants above range quant n could be counted and the q range quants below range quant n. In the embodiment in question however, the range interval counters proceed from the highest numbered range quant in which hits, considered to belong to the target, are recorded for the longest period. If this range quant be r, the first range interval counter 11 is to count the n+p−r range quants above range quant r and the second range interval counter 12 the r−n+q range quants below range quant r. The total range interval will then be: (n+p−r)+(r−n+q)+1=p+q+1. This last method implies that, so long as additional range quants containing hits of the target are located, the range interval count of the two counters is kept at zero, and that the counters are not activated until the instant of establishing the extreme range quants still containing target data. If in a subsequent or in an earlier range quant to more target data are recorded, the range interval counters are activated, until finally reaching the highest numbered range quant in which hits are received for the longest period.

Figure 6:
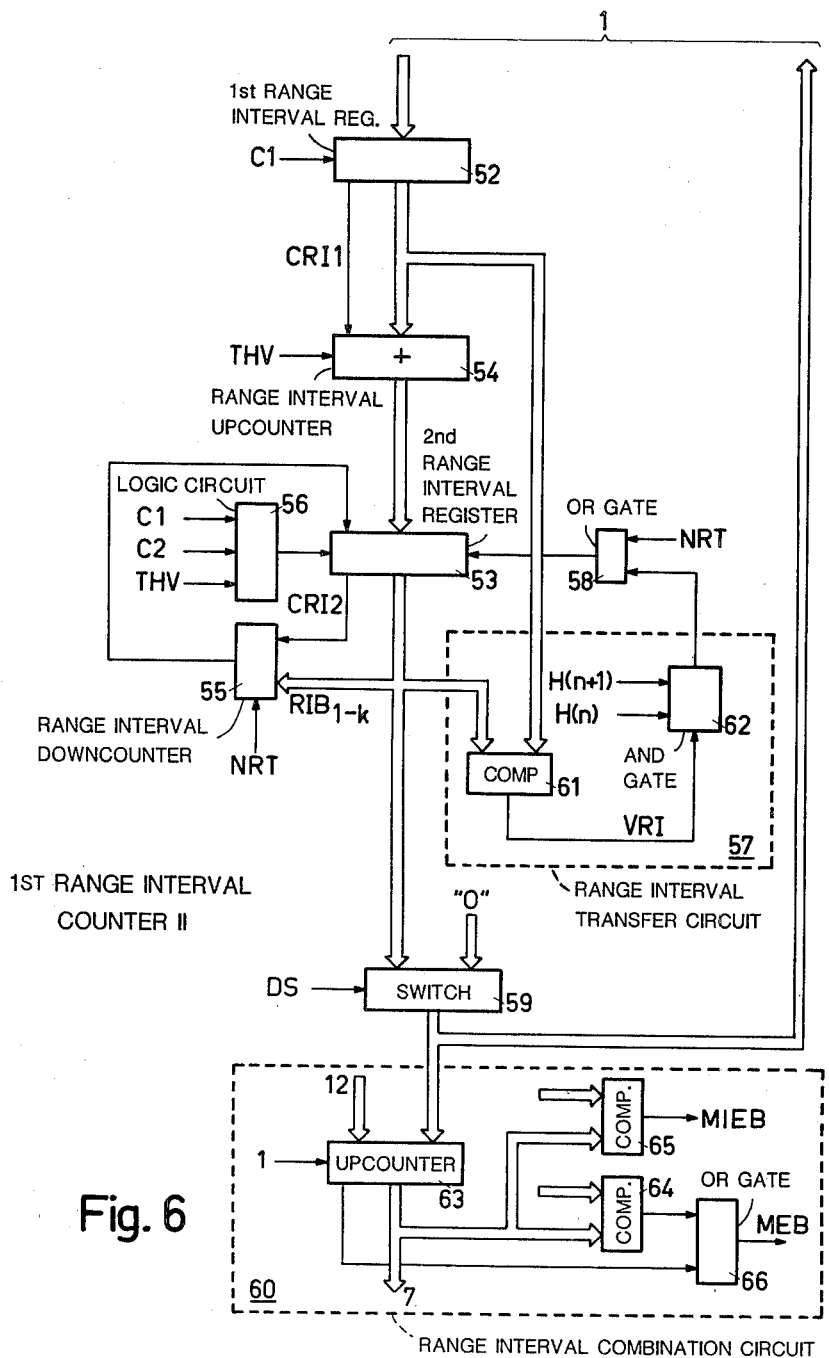
FIG. 6 is a block diagram of a first range interval counter.

A practical embodiment of the first range interval counter 11 is shown in FIG. 6. This counter comprises two range interval registers 52 and 53, a range interval upcounter 54, a range interval downcounter 55, a logic circuit 56, a range interval transfer circuit 57, an OR gate 58, a switch 59, and a range interval combination circuit 60. The range interval data from memory 1 for the consecutive range quants is written into register 52 at a frequency determined by the C1 clock pulses; next, this data, incremented in value in the range interval upcounter 54, if necessary is applied to register 53, where it is decremented in value or otherwise modified, if necessary, and is finally returned to memory 1 via switch 59.

If in range quant $n+1$ data of a target has been recorded, so that $H(n+1)=1$, and the miss criterion has been reached in this range quant, i.e. $M(n+1)=1$, while in range uant n data of this target has been recorded and has met the first detection criterion $D1(n)=1$, the data of range quant $n+1$, contained in the word associated with this range quant, is relocated in the word associated with range quant n unless the data in the latter word has to be placed in the word associated with range quant $n+1$; that is, if in range quant $n+1$ hits of the target have been recorded for the longest period. The relocation of data occurs under the condition determined in central control unit 3.

$$THV = H(n+1).M(n+1).D1(n).\overline{M(n).D1(n-1)},$$

while $H(n)$ must be zero to exclude relocation in a merging situation. The latter condition is comprised in the signal from OR gate 59. The effect of the relocation should be that the range interval count be increased by 1. The word associated with the highest numbered range quant in which the miss criterion has been met last, must finally contain the range interval count which $n+p-r$. This increase of the range interval count, in the case in question is that part of the target range dimension in register 52, occurs in upcounter 54. So long as range interval register 52 has not reached its maximum contents, i.e. so long as CRI1=0, the range interval count from register 52 is incremented by 1 in upcounter 54 through the THV signal. The range interval thus incremented is to be written into register 53 with the C2 clock pulse, i.e. before the contents of the latter register are returned to the memory. The clock signal supplied by logic circuit 56 can therefore be represented by C1+THV.C2. Except in the case that the range interval has been incremented due to the relocation, the range interval is shifted in the register at a frequency determined by the C1 clock pulses.

After relocation of the information of range quant $n+1$ in the word associated with range quant n, which word thus contains the incremented count of the first range interval counter, it is possible that in range quant $n+1$ hits of the target are again recorded. After the relocation, $H(n)=1$ and $H(n+1)=0$; if then again the first detection criterion $D1(N+1)$ is met in range quant $n+1$, the data of range quant $n+1$ has to be added to the target. The addition of this data therefore occurs under the condition determined in central control unit 3:

$$NRT = H(N).\overline{H(n+1)}.D1(n+1).$$

This is done to cancel the increment of the range interval count due to the relocation and to place the corrected range interval count back into the word associated with range quant $n+1$. In case new range quants are involved in the buildup of the target, without relocation of data, or in case new range quants are involved in the buildup of the target after the first range interval counter has been reset to zero through a previous addition of new range quants, the range interval count remains zero; for the range interval is only counted from the last range quant in which hits of the target have been recorded until reaching the range quant in which hits have been recorded for the longest period. The count in the first range interval counter is decremented by means of a signal supplied by the range interval downcounter 55 under the condition:

$$NRT.(RIB1+RIB2+ \ldots +RIBk).\overline{CRI2};$$

that is, if data of a new range quant has to be added to the target, the value in register 53 is other than zero, and no overflow is involved. The downcounting occurs during the C1 clock signal; however, at that instant the data of register 52 may not be transferred to register 53. Therefore, in this special case, this transfer is inhibited by the NRT signal applied via OR gate 58.

On detecting in the first instance two targets, which are subsequently found to merge, the words containing the relevant information of the hit clusters up to then considered to be separate targets, will eventually be placed on top of each other, as already explained with reference to the azimuth counters. The range interval data of one of these words must then be selected for the merged hit cluster. The merging of the targets is given by $H(n).H(n+1)=1$; if this condition is satisfied, the greater of the two range intervals will be selected. A comparator 61 forming part of range interval transfer circuit 57, is provided. This comparator, connected to registers 52 and 53 supplies a signal VRI=1 if the value of register 52 is smaller than that of register 53; otherwise VRI=0. Range interval transfer circuit 57 further comprises an AND gate 62. This AND gate and OR gate 58 are used to block the transfer of the contents of register 52 to register 53 when $VRI.H(n).H(n+1)=1$, making the contents of register 52 equal to that of register 53. If VRI=0, the contents of register 52 are transferred to register 53, in the usual way during the C1 clock pulse.

In the case of relocation of data, the value of register 52 will be smaller than that of register 53, so that VRI=1; furthermore, in order that THV=1, $H(n+1)$ must be 1. Signal $H(n)$ then delivered by AND gate 62 and applied to OR gate 58 can block the transfer from register 52 to register 53. In this way condition $H(n)=0$, supplementary to THV=1, is determined in the circuit.

The range interval count, incremented, decremented or otherwise modified if necessary, need not always be stored in memory 1. For this reason the first range interval counter contains a switch 59, which passes the range interval count to the memory only if the DS signal applied to this switch is 1; if DS=0, the range interval count will be zero. The DS signal is determined in the central control unit and may be represented by:

$$DS = U(n) + THV.\overline{H(n)} + D1(n).\overline{D1(n+1)} + M(n+1).H(n).$$

Hence, the range interval count is stored in memory 1 if at least one of the conditions below has been satisfied, viz. if:

the word containing this range interval count can be read out ($U(n)=1$);

in this word data from the words associated with the preceding range quant must be relocated ($THV.\overline{H(n)}=1$);

the hits recorded in a subsequent range quant cannot be regarded at that moment to belong to the target detected in the particular range quant ($D1(n).\overline{D1(n+1)}=1$); and hits, recorded in a subsequent range quant, are to be regarded as not belonging to the target built up in the particular range quant ($M(n+1).H(n)=1$). The latter case, as will be seen hereafter, occurs with the splitting of a hit cluster into two separate parts.

The range interval count $n+p-r$ passed through switch 59 is not only placed back in memory 1 but is also applied to the range interval combination circuit 60. This circuit contains an upcounter 63 which receives the range interval count $n+p-r$ and the count $r-n+q$ from the second range interval counter 12, and which in response supplies the target dimension in range $(n+p-r)+(r-n+q)+1=p+q+1$ to both the readout circuit 7 and the comparators 64 and 65 forming part of the range interval combination circuit 60. In comparator 64 the detected target dimension in range is compared with a maximum value. If this maximum value is exceeded, the hit cluster up to then regarded as a target will be considered as a clutter area. Range interval combination circuit 60 further comprises an OR gate 66 that, in response to the signal from comparator 64 and the overflow bit from upcounter 63, supplies a signal MEB if the target dimension in range is too large. In comparator 65 the target dimension in range is compared with a minimum value, which is used to eliminate small targets. If the target dimension in range fails to exceed the minimum value, comparator 65 produces the MIEB signal. The MEB and MIEB signals function as control signals for other circuits in the video extractor, and will be described hereafter.

Figure 7:
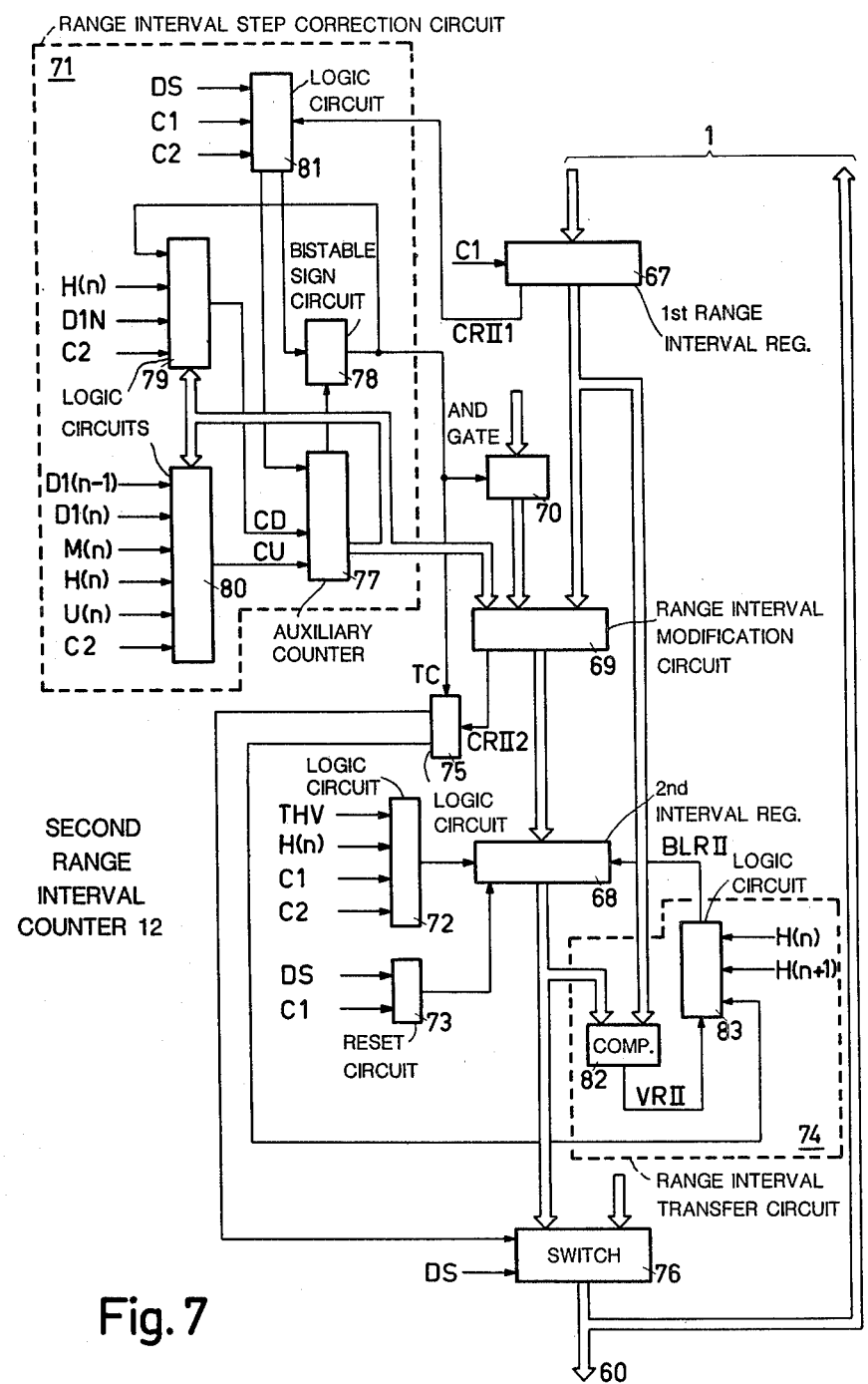
FIG. 7 is a block diagram of a second range interval counter.

A practical embodiment of the second range interval counter 12 is shown in FIG. 7. This counter comprises two range interval registers 67 and 68, a range interval modification circuit 69, an AND gate 70, a range interval step correction circuit 71, a logic circuit 72, a reset circuit 73, a range interval transfer circuit 74, a logic circuit 75, and a switch 76. The range interval data fetched from memory 1 for the consecutive range quants is written into register 67 at a frequency determined by the C1 clock pulses; this data, incremented or decremented if necessary, in the range interval modification circuit 69 is transferred to register 68, where it is modified if necessary, and is then returned to memory 1 via switch 76.

As soon as in a certain radar sweep the first detection criterion is met for the first time in a number of successive range quants directly preceding a range quant in which a target has already been recorded, the data of the latter range quant will be added in building up this target; the target is extended over these range quants in steps. Also, if in a certain radar sweep the miss criterion is reached in a number of consecutive range quants, the data of these range quants must be transferred to the word associated with the last of these range quants or to the word associated with the first range quant following the above range quants; the data is thus shifted in steps.

In case of stepwise extension of the target and stepwise shifting of data, the range interval is changed by means of the range interval modification circuit 69, the AND gate 70, and the range interval step correction circuit 71. Circuit 71 comprises a 4-bit auxiliary counter 77, a bistable sign circuit 78 and three logic circuits 79, 80 and 81.

The number of steps in which the target is extended in forward direction is determined by the negative count of the auxiliary counter. In the case in question this is the count of counter 77 with a negative sign bit recorded in the bistable sign circuit 78. Counter 77 is initiated by the CD signal from logic circuit 79; this signal may be represented by:

$$CD = D1N.\overline{H(n)}.C2.\overline{TC}.\overline{B1}.\overline{B2}.\overline{B3}.\overline{B4}.$$

Auxiliary counter 77 is therefore initiated only if it does not already contain the value $-15$, i.e. the value 1 (B4,B3,B2,B1=0001) with the negative sign bit ($\overline{TC}=1$), if further the requirement of target extension in forward direction has been satisfied ($D1N.\overline{H(n)}=1$), while the count is changed during the C2 clock pulses.

The number of steps, with which a word must be shifted, is determined by the positive count in the auxiliary counter. In the case in question this is the count in counter 77 with a positive sign bit recorded in the bistable sign circuit 78. Counter 77 is then initiated by the CU signal from logic circuit 80; this signal may be represented by:

$$CU = D1(n).\overline{D1(n-1)}.M(n).\overline{H(n-1)}.\overline{U(n)}.C2.\overline{B1}.\overline{B2}.\overline{B3}.\overline{B4}.$$

If in the next range quant the data of range quant n must be transferred, the data of the preceding range quant must first have been placed in the word associated with range quant n and the word associated with range quant $n-1$ must have been erased. Hence, $D1(n).\overline{D1(n-1)}=1$; further the miss criterion must have been satisfied ($M(n)=1$), while the word may not be the last word of the target ($\overline{H(n)}=1$), and the word may not be due for readout ($\overline{U(n)}=1$). Counter 77 may not have reached its maximum value, i.e. 15 (B4,B3,B2,B1=1 1 1 1).

The auxiliary counter 77 and the bistable sign circuit 78 are reset by signals from logic circuit 81. The reset signal for the auxiliary counter can be expressed by: DS.C1+CRII 1; and the signal resetting the sign circuit 78 to its initial state by DS.C1+CRII 1.C2. That is, as soon as the range interval data can be placed in memory 1 or as soon as register 67 is full, the auxiliary counter and the bistable sign circuit must be reset.

The range interval is to be corrected with the count in auxiliary counter 77. In range interval modification circuit 69 the count of counter 77 is added to the range interval value in register 67, unless the counter contains a negative count, i.e. unless the sign circuit 78 supplies a signal $\overline{TC}=1$. In the latter case, the range interval value in register 67 must be decreased by the count of auxiliary counter 77. Since the latter counter is a 4-bit counter and register 67 will contain more bits, the 4-bit word of counter 77 must be supplemented with "ones" when $\overline{TC}=1$. Hence, AND gate 70 passes these "ones" when the sign bit of the auxiliary counter is negative.

As already stated, incrementing by 1 or in steps occurs in circuit 69. The count of the second range interval counter thus incremented is written into register 68 with the C1 clock pulse. Logic circuit 72 supplies a clock signal which can be expressed by C1+THV.$\overline{H(n)}$.C2. If the second range interval counter must be reset, as in the case of the first range interval counter, this clock signal also provides for the transfer of the information in register 67 to register 68 with the C2 clock pulse before the return of the contents of the latter register to memory 1.

On detecting in the first instance two targets, which are found to merge afterwards, the words containing the relevant information of the hit clusters, up to then considered as separate targets, will finally be placed beneath each other, as explained in the description of the azimuth counters. The range interval data of one of these words must then be selected for the merged hit cluster. The merging situation is represented by $\overline{H(n)}.H(n+1)=1$; if this condition is met, the greater of the two range intervals is selected. A comparator 82, forming part of range interval transfer circuit 74, is provided. This comparator, connected to registers 67 and 68, supplies a signal VRII=1 when the contents of register 67 are greater than that of register 68; if not, VRII=0. The range interval transfer circuit 74 further comprises a logic circuit 83. On receiving the VRII signal and the signal $\overline{TC}+\overline{CRII\ 2}$ supplied by logic circuit 75, logic circuit 83 supplies register 68 with the BLRII blocking signal:

$$BLRII = \overline{H(n)}.H(n+1).VRII + \overline{\overline{H(n)}.H(n+1)}.[\overline{TC} + \overline{CRII2}].$$

When BLRII=1, the transfer from register 67 to register 68 is blocked. In a merging situation, BLRII=VRII, and the transfer is blocked when VRII=0. In this case register 68 contains the largest count. Because of this blockade, this count is placed one clock pulse later in the word of which the second range interval count was in register 67. When CRII=1, normal clocking occurs; the largest count was in register 67 and remains in the word which is then the last word of the merged hit clusters. Except in the case of merging, $$BLRII = \overline{TC} + \overline{CRII2},$$

obviously if $\overline{H(n)}.H(n+1)=1$, but this is assumed. In case the contents of register 67 are incremented in circuit 69, TC=1 and therefore BLRII=0; in case the contents of register 67 are decremented in circuit 69, TC=0 so that BLRII=$\overline{CRII\ 2}$, and the transfer to register 68 can be blocked only if CRII=1. If in circuit 69 the contents of register 67 are decremented, it may contain a small number and CRII 2 will be zero or a negative number, so that $\overline{CRII\ 2}$=1. In the latter case, the contents of register 67 will be lost through the blocking of the transfer to register 68.

As in the case of the first range interval counter, the range interval, which may be incremented, decremented or otherwise modified, is passed to the memory only if signal DS applied to switch 76 is 1. If DS=0, the range interval will be 0. Switch 76 also receives the signal $\overline{TC}+\overline{CRII\ 2}$ from logic circuit 75. If in circuit 69 the value of register 67 has been incremented, i.e. $\overline{TC}$=0, this value should be $\overline{CRII\ 2}$=1. If this is not so, i.e. if there is an oveflow bit, a small value will be applied to register 68; this is not in accordance with the fact that the value has been incremented. Hence, in such a case switch 76 passes "ones" only, thus the largest possible positive value.

The signal passed by switch 76 is applied to both memory 1 and the range interval combination circuit 60 of the first range interval counter to be able to determine the total target dimension in range.

The second range interval counter also contains an AND gate 73. When the contents of register 68 are allowed to be passed to the memory, i.e. when DS=1, register 68 is reset during the C1 clock pulse.

The two range interval counters here are of different design. The second range interval counter may of course be identical to the first counter; in this case a stepwise forward target extension and a stepwise transfer of data are left out and replaced by an upcounter and a downcounter analogous to that of the first range interval counter. Also, the first range interval counter may be identical to the second counter; in such a case a stepwise backward target extension and a stepwise relocation of data will be possible. The latter is however more complicated since in case data must be relocated in steps, the particular words must first be fetched back from memory.

Figure 8:
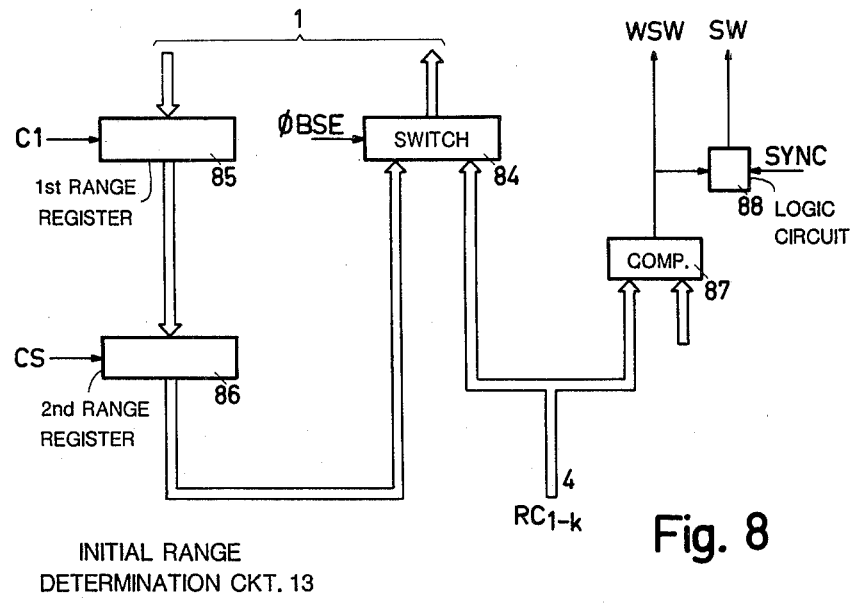
FIG. 8 is a block diagram of a circuit for determining the initial range of a target.

FIG. 8 shows a practical embodiment of circuit 13 for determining the initial range of a target. At the instant the video extractor receives a new echo, the initial range of this echo must also be determined. This occurs by storing the count of range counter 4 in the memory at that instant. The initial range remains in memory until the particular word, of which the initial range forms a part, is erased. The initial range remains of course coupled to the last word of a target, as this word always contains all relevant data about the target.

As already explained with reference to the azimuth counters, as soon as a hit from a new echo is recorded in range quant n, the conditional circuit 51 of FIG. 5 supplies the $\phi$BSE signal for a period determined by the C2 clock pulse and the next C1 clock pulse. The $\phi$BSE signal is not only to provide for the storage of the initial azimuth of the target in memory 1, but also for the storage of the initial range count of range counter 4 in memory 1. The circuit of FIG. 8 contains a switch 84, that passes the count of range counter 4, indicated by bits RC1-k, to memory 1 for as long as $\phi$BSE=1. The circuit of FIG. 8 further contains two range registers 85 and 86. The initial range is transferred from memory 1 to registers 85 and 86 successively at a frequency determined by the C1 clock pulses, unless through a modification of the initial range the transfer from register 85 to register 86 must be skipped or be performed at a time between two successive C1 clock pulses, as determined by the C2 clock pulses. The transfer from register 85 to register 86 is controlled by the CS clock signal:

$$CS = [DS + \overline{H(n)}].C1 + THV.\overline{H(n)}.C2.$$

The initial range modification therefore occurs in the same situations and in the same way as the initial azimuth modification when C$\phi$BR=CS.

The circuit of FIG. 8 finally contains a comparator 87 and a logic circuit 88. Comparator 87 supplies the WSW signal as soon as the range count exceeds the number of range quants, i.e. 1000 in the case in question, in which the measuring range is divided. The WSW signal is applied to central control unit 3 and to logic circuit 88. The latter circuit also receives the synchronization signal SYNC of the radar sweep. Circuit 88 produces a blocking signal SW starting with the appearance of the SYNC signal and finishing with the WSW signal, that is in the period the range counter counts from 0 to 1000 in the case in question. The WSW signal, applied to central control unit 3 fulfills a function relating to the erasure of data, as will be discussed hereafter. The SW signal is applied to video input circuit 5, where it functions as a gate signal for the video signals.

It has already been discussed that two hit clusters, regarded as separate targets, are found to merge and are finally found to belong to one hit cluster. Conversely, it may happen that a hit cluster splits into two clusters. In the embodiment of the video extractor in question such a splitting is not applied for targets, because the direction of antenna rotation would determine whether a hit cluster, if split, will produce two targets. A splitting hit cluster is here considered to belong to one target.

Figure 9:
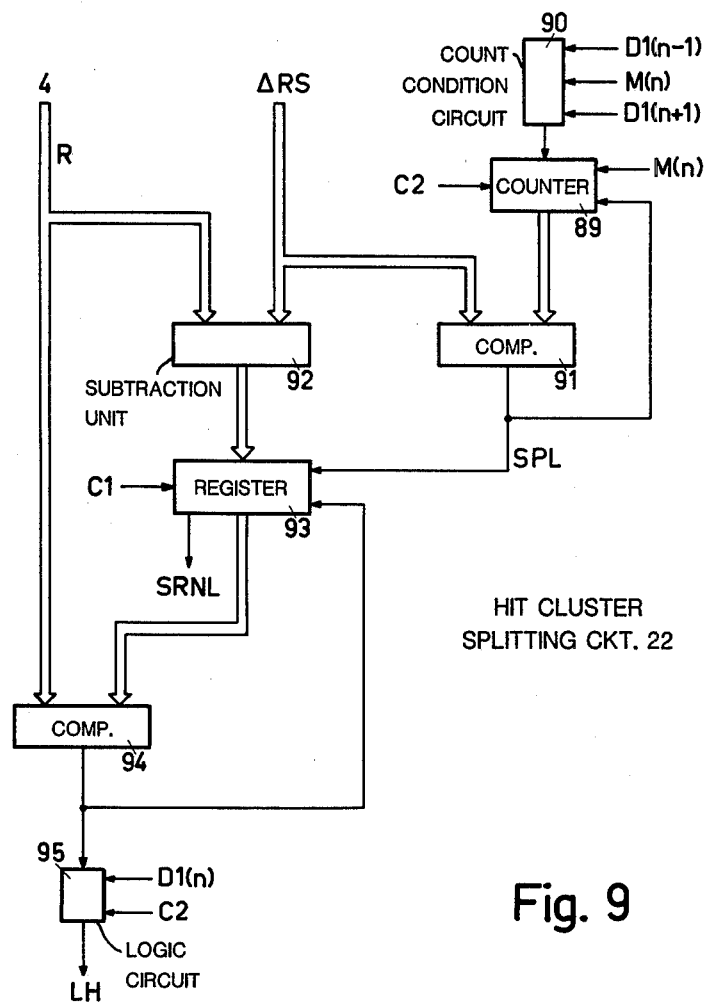
FIG. 9 is a block diagram of a circuit for splitting a hit cluster into two separate target-representing parts.

In the embodiment in question, hit cluster splitting is applied in the event of large clutter areas; for the shadow area of a large clutter region may contain a target. Splitting then occurs if the number of range quants of the shadow area is at least as large as the maximum range interval for a target, or if a certain splitting criterion, introduced for this purpose, is fulfilled. A practical embodiment of circuit 22 for the splitting of a hit cluster into two separate parts is shown in FIG. 9. This circuit comprises a counter 89, a count condition circuit 90, a comparator 91, a subtracton circuit 92, a register 93, a comparator 94, and a logic circuit 95.

In case $M(n)=1$ for range quant n, i.e. if in this range quant the miss criterion is reached, while $D1(n+1)=1$ and $D1(n-1)=1$ for range quants $n+1$ and $n-1$, a shadow area will be present. For no data of the word associated with range quant $n+1$ has been relocated in that associated with range quant n, nor data of the word associated with range quant $n-1$ in the word associated with range quant n. Hence, for the shadow area: $D1(n+1).M(n).D1(n-1)=1$. Under this condition generated in count condition circuit 90 the counter 89 counts the words of the shadow area which meet the miss criterion. The counting occurs with the C2 clock pulses. The count in counter 89 is constantly compared with the splitting criterion $\Delta RS$, i.e. the range interval to be met by the shadow area, so that the hit cluster can be split. This comparison with the splitting criterion occurs in comparator 91, which delivers the SPL signal when this criterion is reached. Next, the range quant which is to contain the relevant data about the first of the two hit clusters obtained after splitting, must be determined; this is done by decrementing the then obtained range count by the splitting criterion reached. This difference $(R-\Delta RS)$ is produced in the subtraction circuit 92 and is subsequently written into register 93 at the instant this register receives the SPL signal. As soon as in the next radar sweep the comparator 94 establishes that the range counter 4 has reached the above difference value of subtraction circuit 92, this comparator supplies a signal applied to logic circuit 95 and to register 93 to reset this register. On receiving this signal, while $D1(n)=1$, circuit 95 produces the LH signal with the C2 clock pulse. The LH signal, thus produced on reaching the range quant which is to contain the relevant data of the first target obtained after splitting, sets the H-bit associated with this range quant. The H bit of the last target obtained after splitting was already determined, namely as the H bit of the hit cluster before splitting. As will be explained with reference to FIG. 10, the LH signal also sets the S bits of the range quants containing the relevant data of the two targets obtained after splitting. Thereafter, splitting can actually occur by erasing all words of the shadow area having reached the miss criterion; the memory then contains two echoes.

In the case of recording a hit causing M(n) to become 0 in the particular range quant, counter 89 must be reset. This implies that, if the shadow area contains a target, the range interval of this area should be more than twice as large as in the case this area does not contain a target in order that splitting occurs. Only targets in the shadow of large clutter areas are thus detected.

As will be explained hereafter in the description of control bit recording means 14, the splitting of a hit cluster is identifiable by the condition $M(n+1).H(n)=1$. Under this condition $DS=1$ and hence the C$\phi$BR clock signal, as well as the CS clock signal, is equal to C1. Therefore, with the splitting of a hit cluster the initial and final azimuth angles and the initial ranges for the two words identified by the H bit, are normally clocked from registers 43, 45 and 85, to registers 44, 46 and 86, respectively. The initial azimuth angles and the initial ranges of the other words are not clocked.

As already put forward in the foregoing, the processes to which the words read from memory 1 are subjected before they are returned to the memory, are performed under joint control of special bits. These control bits, the majority of which have already been discussed, are distinguished as follows:

Recording bit (R bit); when the video extractor receives a new echo, the R bit of the particular range quant is set high. The R bit thus indicates that this range quant is occupied;

First detection bit (D1 bit); on recording a minimum number of hits in a certain range quant, the D1 bit is set high. The D1 bit thus indicates that the first detection criterion has been met;

Identification bit (H bit); if a certain echo is built up from hits in several range quants, the dimension of the echo in range must be determined. This dimension is included with the last word associated with the target. The H bit identifies this last word. The H bit is set high as soon as in the last range quant, added to the target, the first detection criterion has been met. The H bit associated with the preceding range quant is then reset to the low state;

Second detection bit (D2 bit); as soon as in a certain range quant the number of hits recorded is such that this range quant is surely to be included in building up a target, the D2 bit is set high. The D2 bit thus indicates that the second detection criterion has been met;

Miss bit (M bit); when in a certain range quant no hits are recorded in a number of radar sweeps, and hence a number of misses are recorded, the M bit is set high. The M bit thus indicates that the miss criterion has been met;

Readout bit (U bit); as soon as the miss criterion has been reached in the range quant, of which the H bit is set, the word associated with this range quant can be read out. This is indicated by the U bit;

Splitting bit (S bit); the S bit is set after meeting the splitting criterion and after determining the range quant of the two echoes produced with the splitting, of which range quant the associated word contains the relevant data on the split echo.

Figure 10:
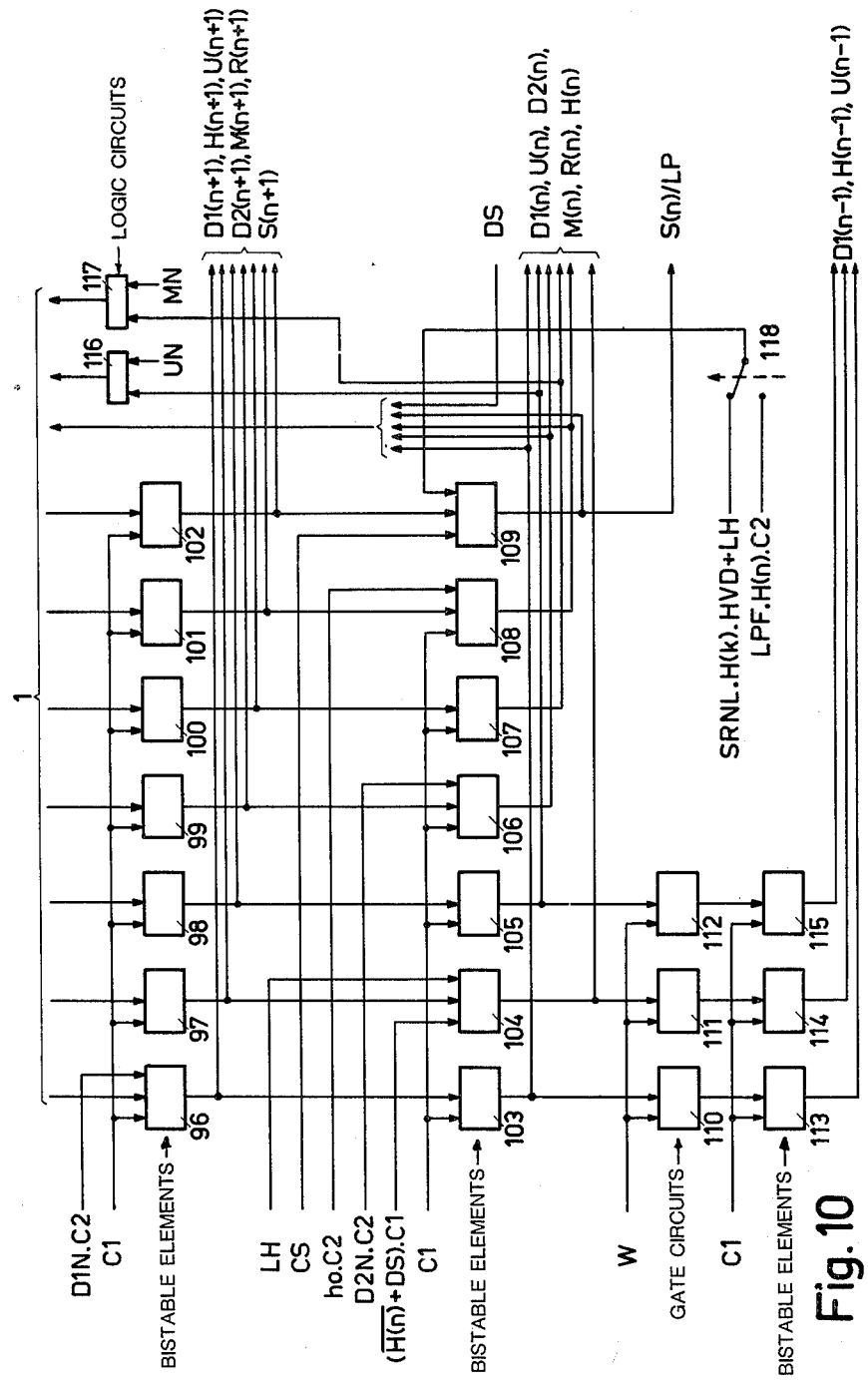
FIG. 10 is a block diagram of the control bit recording means.

The position of the control bits is recorded in memory 1 for each range quant. FIG. 10 shows a practical embodiment of control bit recording means 14, i.e. the circuit used for modifying the control bit positions. Means 14 comprises seven bistable elements 96-102, containing the positions of the control bits of range quant n+1, seven bistable elements 103-109, containing the positions of the control bits of range quant n, three gate circuits 110, 111 and 112, three bistable elements 113, 114 and 115, containing the positions of three control bits of range quant n−1, two logic circuits 116 and 117, and a switch 118.

The D1 bits fetched from memory 1 for the consecutive range quants are written into element 96 at a frequency determined by the C1 clock pulses and, after modification in element 103, if necessary, are returned to memory 1. As soon as hit counter 8 delivers the D1N signal, indicating that at that instant the first detection criterion has been met, the D1 bit position in element 96 is modified accordingly in the presence of the C2 clock pulse.

The U bits fetched from memory 1 for the consecutive range quants are written into elements 98 and 105 successively on the appearance of the C1 clock pulses, and, after modification in logic circuit 116, if necessary, are returned to the memory. As soon as the central control unit 3 delivers the UN signal, indicating that from that instant the relevant word can be read out, the U bit position is modified accordingly. The UN signal is supplied by unit 3 under the condition:

$$UN = H(n).D2(n).M(n).\overline{D1(n-1)}.\overline{D1(n+1)}.\overline{U(n)},$$

that is, if in the range quant identified by the H bit the second detection criterion and the miss criterion have been reached while the U bit has not been set and no data is left in the adjoining range quants.

The D2 bits fetched from memory 1 for the consecutive range quants are written into elements 99 and 106 successively on the appearance of the C1 clock pulses and, after modification, if necessary, are returned to the memory. As soon as hit counter 8 delivers the D2N signal, indicating that at that instant the second detection criterion has been met, the D2 bit position in element 106 is modified accordingly.

The M bits fetched from memory 1 for the consecutive range quants are written into elements 100 and 107 successively on the appearance of the C1 clock pulses and after modification in logic circuit 117 if necessary, are returned to memory 1. As soon as the miss counter 9 delivers the MN signal, indicating that at that instant the miss criterion has been met, the M bit position is modified accordingly.

The R bits fetched from memory 1 for the consecutive range quants are written into elements 101 and 108 successively on the appearance of the C1 clock pulses and after modification if necessary, are returned to memory 1. As soon as in a certain range quant a hit is received (ho=1), the R bit position is modified accordingly in the presence of the C2 clock pulse.

As to the H bit, complications arise; not the H bit itself, but the DS bit is stored in the memory. The DS bits fetched from memory 1 for the consecutive range quants are written into element 97 with the C1 clock pulses and are regarded in this element as H bits (H(n+1)). If a number of hits are recorded in range quant n only, the H bit and the DS bit will be zero so long as the first detection criterion has not been reached. On reaching this detection criterion $D1(n).\overline{D1(n+1)}=1$ and hence DS=1. The DS bit is stored in memory and in the next radar sweep it is read out as H(n) bit of value 1. If more hits are recorded, DS will remain 1 and therefore in each radar sweep the DS bit will be read out as H(n) bit of value 1. If subsequently in range quant n+1 the first detection criterion is met, DS=0 for range quant n, so that $\overline{H(n)}+DS=0$ and the contents of element 97 are not transferred to element 104; the effect thereof is that H(n+1)=1. Because DS=0, H(n)=0 for the next radar sweep. That is, the identification bit is shifted up one range quant when in this range quant hits, considered to be contributing to the buildup of the target, are recorded. Conversely, in the case of relocation of data, the identification bit must be shifted down one range quant. In the case of splitting of a hit cluster, the LH signal, as already described, is to set the H bit of the range quant of which the associated word contains the relevant data of the first of the targets obtained after splitting. The LH signal ensures that element 104 is set, so that H(n)=1.

The S bits fetched from memory 1 for the consecutive range quants are written into element 102 with the C1 clock pulses and, in the presence of the CS clock pulses, they are placed in element 109, from which they are returned to memory 1. Furthermore, element 109 can be set either by LH+SRNL.H(n).HVD or by LPF.H(n).C2, as will be explained later. In case of target splitting, the S bits S(k) and S(n) of range quants k and n are set; the associated words contain the relevant data of the targets obtained after splitting. The LH signal sets the H bit and the S bit of range quant n. The H bit of range quant k was already present. The S bit of range quant k is set by signal SRNL.H(k).HVD, where SRNL from register 93 (see FIG. 9), is indicative of a splitting and HVD of the assignment of the H bit of the first target by the LH signal. For a target splitting the relevant term in the DS signal can be represented by M(n+1).H(n). This signal, produced with a splitting situation, causes that DS=1 and hence CS=C1, shifting both the H bit and the S bit into the memory.

For the tracking of one given target the video extractor contains a light pen connection. During each antenna revolution the target must be indicated on the display with the light pen. When the light pen senses the target, the light-pen bit (L bit) in the video processor is set. No target is placed in the readout register except the target with a light-pen bit. For simplicity the S bit is used for the L bit when switching to the light-pen mode of operation. The S bit is then left out of consideration, as in practice the targets selected are those which cannot be split. In the light-pen mode of operation, switch 118 is in the position not shown in the figure; element 109 is then set by signal LPF.H(n).C2, where LPF is the signal indicative of the light-pen mode of operation. Signal S(n)/LP therefore indicates whether the S bit or the L bit is high, depending on the position of switch 118.

The output signals of elements 96-102 and 103-109, returned to memory 1, are also used as control signals for the actions executed in the video extractor. They are indicated as such by D1(n+1), H(n+1), U(n+1), D2(n+1), M(n+1), S(n+1) and D1(n), U(n), D2(n), M(n), R(n), H(n). Also needed are D1(n−1), H(n−1) and U(n−1), as control signals. The latter signals are therefore stored separately in elements 113, 114 and 115. Since the control bits sent to the memory can all be reset before they are stored in memory, it should also be possible to reset the control bits stored in elements

113-115. Gate circuits 110, 111 and 112 are provided to block the transfer of the contents of elements 103, 104 and 105 to elements 113, 114 and 115 by means of a gating signal W. The generation of this gating signal is described hereafter.

As already stated, the relevant data about an echo is contained in the range quant identified by the H bit. The data contained in words associated with other range quants is finally placed in the word associated with the range quant identified by the H bit. The words associated with the other range quants can then be erased.

If the miss criterion is reached in a range quant not identified by the H bit, the data in this range quant must be erased if in the preceding range quants no relevant data has been obtained or the data therein has already been erased. This "breaking up" of the target pattern at the front occurs under the condition $\overline{H(n)}.M(n).\overline{D1(n-1)}$. The target pattern may however also be "broken up" at the back, namely with the relocation of data; in this case $M(n).\overline{D1(n-1)}=0$, as otherwise the target pattern would be broken up at the front. The relocation condition is therefore reduced to $H(n+1).M(n+1).D1(n)$, and since the erasure of the data occurs a clock pulse later, the erasure condition can be represented by $H(n).M(n).D1(n-1)$.

The data of a range quant may also be erased if the miss criterion is reached in a range quant before meeting the first detection criterion, thus under the condition $M(n).D1(n)$, if in a range quant identified by the H bit the miss criterion is reached before meeting the second detection criterion, thus under the condition $H(n).M(n).\overline{D2(n)}$, and if a word identified by an H bit is placed in the readout register. In the latter case the readout line may not be erased, as indicated by the $\overline{WU}$ signal; the data is then erased under the condition $H(n).U(n).\overline{WU}$. Data is to be erased also when circuit 13 produces the WSW signal, i.e. when range counter 4 has reached the end of the range interval observed, as no data is required about any other range quants. Finally, data is to be erased under the condition $H(n-1).M(n)$. If with the splitting of a hit cluster the word associated with range quant n contains relevant data of the first of the targets obtained after splitting, $H(n)=1$. If further relevant data of the last target obtained with the splitting is contained in the word associated with range quant k, the words associated with range quant $n+1, n+2, \ldots, k-1$ must be erased. First the word associated with range quant $n+1$ is erased if in this word the miss bit is high; this bit will always be high when target splitting is to occur. In such a case condition $H(n).M(n+1)=1$ is satisfied, and since the erasure of data occurs a clock pulse later, the erase condition will then be $H(n-1).M(n)$. After thus erasing the word associated with range quant $n+1$, the words associated with range quants $n+2, \ldots, k-1$ are erased in the same way.

Summarising the above, the erasure of data therefore occurs under the condition:

$$W = \overline{H(n)}.M(n).\overline{D1(n-1)} + H(n).M(n).D1(n-1) + M(n).\overline{D1(n)} + +H(n).M(n).\overline{D2(n)} + H(n).U(n).\overline{WU} + H(n-1).M(n) + WSW.$$

This logic operation is performed in central control unit 3 on the supply of the relevant control bits of the control bit recording means 14, the WSW signal of circuit 13 for determining the initial range, and the $\overline{WU}$ signal generated in readout circuit 7 and referred to below. The W gating signal is supplied to gate circuits 15-21 of FIG. 1 to block the transfer of data from units 8-14 to the memory, resulting in the erasure of the word containing this data. As already stated, the gating signal is applied to gate circuits 110-112 of the control bit recording means.

Figure 11:
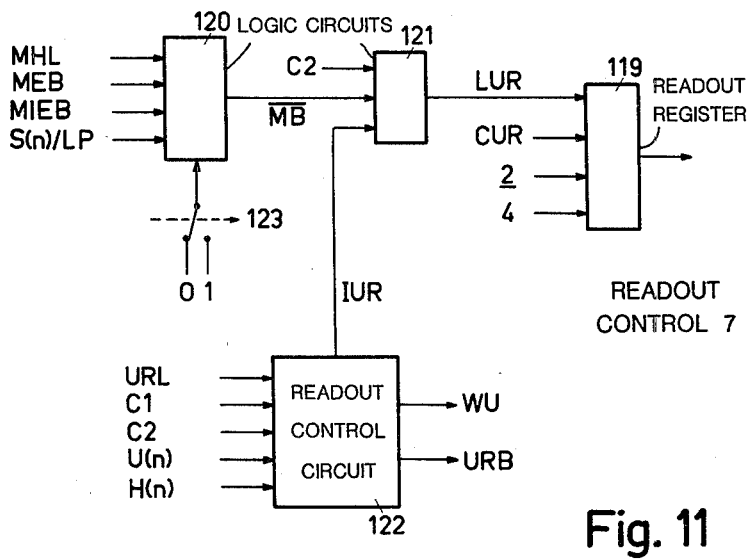
FIG. 11 is a block diagram of a readout circuit.

Finally, FIG. 11 shows an embodiment of readout circuit 7. This circuit comprises a readout register 119, two logic circuits 120 and 121, a readout control circuit 122 and a switch 123.

Logic circuit 120 is supplied with the following signals:

the MHL signal from hit counter 8, indicating whether the number of hits received exceeds the maximum number permitted;

signals MEB and MIEB from the first range interval counter 11, respectively indicating whether the recorded range interval has exceeded its maximum value and whether it failed to reach its minimum value; and signal S(n)/LP from control bit recording means 14, indicating whether the hit cluster must be split, or whether the hit cluster has been indicated with a light pen for readout. The logic circuit 120 produces the $\overline{MB}$ signal; with switch 123 in the position as shown in the figure, the $\overline{MB}$ signal can be expressed by:

$$\overline{MB} = \overline{MHL + MEB + MIEB + S(n)/LP};$$

with switch 123 in the position not shown in the figure, $\overline{MB}=0$. In the latter position, the data can always be read out, even if the hit cluster concerns a clutter area, while in the former position the data can be read out only if the dimensions of the hit cluster are within the set limits and the hit cluster is not to be split, or if the hit cluster has been indicated with the light pen. Under condition $IUR.\overline{MB}$ the logic circuit 121 supplies the LUR signal at the instant of the C2 clock pulse; the LUR signal indicates that the readout register 119 is ready to receive information. Readout control circuit 122 produces the IUR signal indicating that readout register 119 is in principle ready to receive information. At the instant of the CUR clock pulses the following information can be shifted out of readout register 119:

the information from arithmetic unit 2, viz. the hit count, the count of the miss counter/readout counter, the count of the initial and final azimuth values of a target, the count of the first range interval counter, the total range interval and the initial range of the target; and the information from range counter 4, viz. the final range of the target. Since the readout of information is determined by the device connected, this device receives the URB signal from readout control circuit 122 to indicate that readout register 119 is occupied. The device connected provides for the readout; it thereto supplies the CUR shift clock pulses, and sends the URL signal to readout control circuit 122 to indicate that all information has been read out of register 119. The IUR signal is generated under the control of the C1 and C2 clock pulses and under the conditions of the H and U bits, for the readout of words is restricted to the words with the U bit set high, which words are identified by the H bit. Readout control circuit 122 finally provides the WU signal, indicating that as soon as the information to be read out has been transferred to readout register 119, the relevant memory word can be erased.

From the readout information the device connected is able to determine the correct target position, i.e. the average range and azimuth values, as well as the target dimensions in azimuth and in range and the orientation of the target.

We claim:

1. A video extractor for use in a pulse radar apparatus, comprising:
   A. a shift-register memory, which is capable of storing a number of words corresponding with the number of range quants dividing the range interval to be covered by the pulse radar apparatus, said words containing information describing the number of hits received in a range quant, the number of misses established in a range quant, the initial and the final azimuth values of a target, the number of range quants in which the hits contributing to the buildup of a target have been recorded, the initial range of a target, and the status of various control bits for each range quant, said control bits including:
      a. a recording bit (R bit), indicating that a new echo is applied to the video extractor in a certain range quant;
      b. a detection bit (D bit), indicating that in a certain range quant a minimum number of hits have been recorded;
      c. an identification bit (H bit), indicating the word in which the data to be determined is concentrated;
      d. a miss bit (M bit), indicating that in a certain range quant no hits have been recorded; and
      e. a readout bit (U bit), indicating that the word associated with a certain range quant can be read out;
   B. a range counter whose counting rate is equal to the rate at which said words are shifted in the memory;
   C. an arithmetic unit, comprising:
      a. a hit counter for recording the number of hits received in a range quant;
      b. a miss counter for recording the number of misses established in a range quant;
      c. a circuit for determining the initial and the final azimuth values of a target;
      d. a range interval counting unit for determining the number of range quants in which the hits contributing to the buildup of a target have been recorded;
      e. a circuit for determining the initial range of a target;
      f. control bit recording means for recording the status of the various control bits for each range quant;
      said arithmetic unit receiving the words shifted out of memory and, in response to video and angular data received from the pulse radar apparatus and to range data provided by the range counter, updating information contained in said words during successive range sweeps and effecting concentration of information referring to each target in a single word by transferring the updated information to following or preceding words fetched from memory;
   D. a central control unit generating control signals which together with the control bits controls the counters and circuits of the arithmetic unit; and
   E. a readout circuit adapted to read out target position, size and range information from the words and to read out target range information from the range counter.

2. A video extractor as in claim 1, wherein the hit counter comprises a first and a second register and an adder circuit, whereby the hit counts fetched from memory for the successive range quants and contained in the corresponding words are transferred to the first and the second registers, incremented by 1 in the adder circuit if a hit has been recorded in the respective range quant, and shifted back into the memory.

3. A video extractor as in claim 2, wherein the hit counter comprises a first comparator for comparing the recorded number of hits with a preset detection criterion and, if said criterion has been met, adapting the status of the D bit accordingly.

4. A video extractor as in claim 3, wherein the hit counter comprises a second comparator for comparing the recorded number of hits with a preset maximum length criterion, and if said maximum length criterion has been met, effecting delivery of a signal to the readout circuit to block the readout of the word containing the respective hit count.

5. A video extractor as in claim 2, wherein the hit counter comprises a modification circuit, including a comparator for indicating whether the contents of the first register are larger or smaller than the contents of the second register, and further including a logic circuit which, in response to said indication provided by said comparator, makes the contents of the two registers equal to each other when the minimum number of hits is recorded in the range quants of which the hit counts are contained in the two registers.

6. A video extractor as in claim 1, wherein the miss counter comprises a first and a second register, a counting control circuit, and a counting circuit controlled by said counting control circuit, whereby the miss counts fetched from memory for the successive range quants and contained in the corresponding words are transferred to the first and the second registers, incremented by 1 in said counting circuit if said counting control circuit establishes a miss in the respective range quant after the recording of hits, and shifted back into the memory.

7. A video extractor as in claim 6, wherein the miss counter comprises a comparing circuit for comparing the recorded number of misses with a present miss criterion and, if said miss criterion has been met, adapting the status of the M bit accordingly.

8. A video extractor as in claim 6, wherein the counting control circuit comprises means for applying a signal to the counting circuit effecting decrementing of the miss count by 1, for a certain range quant, if a hit is recorded for that quant while the existing hit count therefor is other than zero.

9. A video extractor as in claim 8, wherein the miss counter comprises a resetting circuit, including a logic circuit and a switch controlled by this logic circuit, whereby at the instant a detection criterion is met the logic circuit controlling the switch causes switch to shift the zero-set miss count back into the memory.

10. A video extractor as in claim 8, wherein the miss counter comprises a resetting circuit including a logic circuit and a switch controlled by this logic circuit, whereby, if in a certain range quant a hit is recorded while the hit count for said certain range quant is already other than zero or is other than zero at the instant of meeting a detection criterion, the logic circuit controlling the switch causes the switch to shift the zero-set miss count back into the memory.

11. A video extractor as in claim 1, wherein the circuit for determining the initial and final azimuth values of a target comprises a first and a second register, an azimuth control circuit and a first switch controlled by said azimuth control circuit, whereby, as soon as a new echo is established in a certain range quant, said azimuth control circuit acts on said first switch to pass the instantaneous antenna azimuth value, applied to the video extractor, to the memory, and whereby the initial azimuth values fetched from memory for the successive range quants and contained in the corresponding words are shifted through the first and the second registers successively, and are then returned to the memory via said first switch only if said first switch is not in the position in which the instantaneous antenna azimuth value is passed to the memory.

12. A video extractor as in claim 11, wherein the circuit for determining the initial and final azimuth values of a target comprises a third and a fourth register and a second switch controlled by the azimuth control circuit, whereby as soon as a hit is recorded in a range quant identified by the H bit, after meeting a detection criterion, the logic circuit acts on said second switch to pass the instantaneous antenna azimuth value, applied to the video extractor, to the memory in each radar sweep until establishing the end of the echo, and whereby the final azimuth values fetched from memory for the successive range quants and contained in the corresponding words are shifted through the third and the fourth registers successively, and are then returned to the memory via said second switch only if said second switch is not in the position in which the instantaneous antenna azimuth value is passed to the memory.

13. A video extractor as in claim 12, wherein the azimuth control circuit comprises a comparator for indicating whether the contents of the first register are larger or smaller than the contents of the second register, and a conditional circuit, which responds to data supplied by the comparator, to the 180° bits of the azimuth values contained in said four registers, and to the H bits of the range quants of which the initial azimuth values are contained in the respective registers, by equalizing, in case two echoes merge into one new hit cluster, the initial azimuth value of the hit cluster so produced and the initial azimuth value contained in the first and the second registers.

14. A video extractor as in claim 13 wherein the central control unit, if at least the minimum number of hits have been recorded in the range quants for which the initial azimuth values are contained in the respective registers, is enabled to generate a timing signal, and the conditional circuit comprises means to make the contents of the first and the second registers equal to each other in response to the timing signal.

15. A video extractor as in claim 13, wherein the circuit for determining the initial range of a target comprises a first and a second range register and a switch whereby, as soon as a new echo is established in a certain range quant, the conditional circuit forming part of the azimuth control circuit acts on said switch to pass the range value, supplied by the range counter, to the memory, and whereby the initial range values fetched from memory for the successive range quants and contained in the corresponding words are shifted successively through the first and the second range registers and are subsequently returned to the memory via said switch, provided that said switch is not in the position in which the instantaneous range value is passed to the memory.

16. A video extractor as in claim 15, wherein the central control unit, in case at least the minimum number of hits has been recorded in the range quants of which the initial range values are contained in the respective registers, is enabled to generate a timing signal and the conditional circuit comprises means to make the contents of the first and the second registers equal to each other in response to the timing signal.

17. A video extractor as in claim 15, wherein the circuit for determining the initial range of a target comprises a comparator for comparing the range value supplied by the range counter with a fixed value indicating the end of the range to be covered, which comparator supplies thereupon a signal indicating that the memory-stored words, corresponding with range quants exceeding said fixed value, can be erased.

18. A video extractor as in claim 1 wherein the range interval counting unit comprises a first range interval counter for counting the range quants in which hits contributing to the build-up of a target have been recorded, counting from the most distant range quant in which hits of the target have been recorded for the longest time, and a second range interval counter for counting the range quants, which contain hits contributing to the build-up of a target and which are situated before the most distant range quant in which hits of the target have been recorded for the longest time.

19. A video extractor as in claim 18, wherein the range interval counting unit comprises a range interval combination circuit which generates the range interval count by summing the counts of the first and second range interval counters and by incrementing the so obtained value by 1.

20. A video extractor as in claim 19, wherein the range interval combination circuit comprises a comparator for comparing the range interval count with a present maximum interval criterion, whereby, if said criterion has been met, a signal is applied to the readout circuit to block the readout of the word containing the respective range interval data.

21. A video extractor as in claim 19, wherein the range interval combination circuit comprises a comparator for comparing the range interval count with a preset minimum interval criterion, whereby, if said minimum interval criterion has been met, a signal is applied to the readout circuit to block the readout of the word containing the respective range interval data.

22. A video extractor as in claim 18, wherein the first range interval counter comprises a first and a second register, an upcounter and a downcounter, whereby the counts fetched from memory for the successive range quants and contained in the corresponding words are transferred to said first register, incremented by 1 in said upcounter if the data in the word of which the first range interval count is contained in the first register, is placed in the preceding word fetched from memory, of which preceding word the first range interval count is contained in the second register, which first range interval counts are transferred to the second register, incremented by 1 in said downcounter if the data in the word of which the first range interval count is contained in the second register is placed in the following word fetched from memory, of which following word the first range interval count is contained in the first register, and are shifted back into memory.

23. A video extractor as in claim 22, wherein the first range interval counter comprises a switch, controlled by the central control unit, for causing the first range interval count to be shifted back into memory if:
   the word containing said first range interval count is read out;
   the data in said word is to be transferred to the preceding word fetched from memory; and
   the hits recorded in the relevant range quant cannot or cannot yet be regarded as belonging to the target detected in the preceding range quant.

24. A video extractor as in claim 22, wherein the first range interval counter comprises a comparator, for indicating whether the contents of the first register are greater or smaller than the contents of the second register, and an AND circuit for responding to the data provided by said comparator and to the H bits of the range quants of which the first range interval counts are contained in the respective registers, by equalizing, in case two echoes merge into one hit cluster, the first range interval count of said hit cluster and the smaller of the two first range interval counts.

25. A video extractor as in claim 18, wherein the second range interval counter comprises a first and a second register and a range interval modification circuit, whereby the range interval counts fetched from memory and contained in the corresponding words are transferred to the first register, if necessary incremented or decremented in steps in said range interval modification circuit, and shifted back into memory via said second register, and where said second range interval counter further comprises a range interval step correction circuit, in which correction circuit, in case a number of successive range quants contain information contributing to the build-up of the target and meet the miss criterion at the same time, said number of successive range quants is determined to subsequently increment the count of the second range interval counter, and in which correction circuit, if thereafter again in a number of successive range quants the first detection criterion is reached at the same time, said number of range quants is determined to decrement the count of the second range interval counter, which count cannot assume a negative value.

26. A video extractor as in claim 25, wherein the second range interval counter comprises a range interval transfer circuiit including a comparator and a logic circuit, said comparator indicating whether the contents of the first register are greater or smaller than the contents of the second register, and said logic circuit responding to the comparator-supplied data and to the H bits of the range quants of which the second range interval counts are contained in the respective registers, by equalizing, in case two echoes merge into one hit cluster, the second range interval count of the hit cluster so produced and the greater of the two second range interval counts.

27. A video extractor as in claim 1, wherein the arithmetic unit comprises a circuit for splitting a hit cluster into two separate parts in which circuit, when the magnitude of the shadow area of the hit cluster meets a splitting criterion, a signal is generated to split the hit cluster.

28. A video extractor as in claim 27, wherein the circuit for splitting a hit cluster comprises a counter for determining the magnitude of the shadow area of the hit cluster, a first comparator connected to said counter for indicating when the count of said counter has reached the present splitting criterion, in which case the range value of the range counter, decremented by the magnitude of the splitting criterion, is written into a register thereto incorporated and a second comparator for comparing the value contained in said register with the range value of the range counter, said second comparator, if in the radar sweep following that in which the value of said register is applied to the second comparator the range value equals the value in said register, supplying a signal for determining in the control bit recording means the H bit of the foremost of the parts produced by splitting.

29. A video extractor as in claim 28, wherein the control bit recording means comprises a bistable element for recording the status of the splitting bit (S bit) indicating that the H bit of the two parts produced by splitting has been determined and that the hit cluster can be split.

* * * * *